(12) United States Patent
Thuis et al.

(10) Patent No.: US 10,136,631 B2
(45) Date of Patent: Nov. 27, 2018

(54) BED BUG TRAP AND MONITOR

(71) Applicant: Ecolab USA Inc., St. Paul, MN (US)

(72) Inventors: Alicia Nichole Thuis, Eagan, MN (US); Joelle F. Olson, Shoreview, MN (US); Douglas B. Gardner, Maplewood, MN (US)

(73) Assignee: Ecolab USA Inc., St. Paul, MN (US)

( * ) Notice: Subject to any disclaimer, the term of this patent is extended or adjusted under 35 U.S.C. 154(b) by 250 days.

(21) Appl. No.: 14/628,433

(22) Filed: Feb. 23, 2015

(65) Prior Publication Data
US 2015/0237842 A1 Aug. 27, 2015

Related U.S. Application Data

(60) Provisional application No. 61/943,855, filed on Feb. 24, 2014.

(51) Int. Cl.
*A01M 1/10* (2006.01)
*A01M 1/14* (2006.01)
*A01M 1/20* (2006.01)

(52) U.S. Cl.
CPC .............. *A01M 1/103* (2013.01); *A01M 1/14* (2013.01); *A01M 1/20* (2013.01); *Y02A 50/374* (2018.01)

(58) Field of Classification Search
CPC ........... A01M 1/103; A01M 1/14; A01M 1/20
See application file for complete search history.

(56) References Cited

U.S. PATENT DOCUMENTS

| 1,259,911 | A | * | 3/1918 | Seibert | A01M 1/103 |
|---|---|---|---|---|---|
| | | | | | 43/131 |
| 3,484,374 | A | | 12/1969 | Henryk | |
| 4,217,722 | A | * | 8/1980 | McMullen | A01M 1/14 |
| | | | | | 43/114 |
| 4,709,504 | A | * | 12/1987 | Andric | A01M 1/14 |
| | | | | | 43/114 |

(Continued)

FOREIGN PATENT DOCUMENTS

| CA | 2130375 | 4/1995 |
|---|---|---|
| CN | 202026723 | 11/2011 |

(Continued)

OTHER PUBLICATIONS

International Search Report and Written Opinion for International Application No. PCT/US2015/034715, dated Sep. 1, 2015, 15 pages.

(Continued)

*Primary Examiner* — Michael H Wang
(74) *Attorney, Agent, or Firm* — Merchant & Gould P.C.

(57) ABSTRACT

A trapping device and method for capturing and monitoring the existence and behavior of crawling insects, such as bed bugs, is provided. The trapping device has a textured two-dimensional surface with one or more triangular entrance areas, where one of the triangular sections functions as a base, one or more wing sections, connected to either one the base or to another wing section by a neck; and a collecting area connected to one or more wing sections by a bridge. The trapping device can further include a support structure, and can be enclosed in a case with one or more entrances. The trapping device can also comprise a catching area that can optionally include an adhesive for immobilizing the insects.

20 Claims, 39 Drawing Sheets

(56) References Cited

U.S. PATENT DOCUMENTS

| | | | |
|---|---|---|---|
| 4,800,671 A * | 1/1989 | Olson | A01M 1/18 43/108 |
| 4,862,638 A * | 9/1989 | Stevenson | A01M 1/14 428/40.1 |
| 5,102,662 A | 4/1992 | Gallagher | |
| 5,119,586 A * | 6/1992 | Townsend | A01M 1/14 43/114 |
| 5,438,792 A * | 8/1995 | Monett | A01M 1/14 43/114 |
| 5,454,186 A * | 10/1995 | Gang | A01M 1/14 43/114 |
| 5,597,599 A | 1/1997 | Smith et al. | |
| 6,063,418 A | 5/2000 | Sugimoto et al. | |
| 6,106,821 A | 8/2000 | Baker | |
| 6,696,424 B1 | 2/2004 | Wheeler | |
| 6,766,612 B1 | 7/2004 | Liu | |
| 6,814,956 B2 | 11/2004 | Besser et al. | |
| 7,444,711 B2 | 11/2008 | Garcia et al. | |
| 7,910,056 B2 | 3/2011 | Ivanine et al. | |
| 8,146,290 B1 | 4/2012 | Telly | |
| 8,282,952 B2 | 10/2012 | Smit | |
| 8,413,370 B2 * | 4/2013 | Messian | A01M 1/14 43/114 |
| 8,661,728 B2 | 3/2014 | Borth | |
| 8,789,309 B2 * | 7/2014 | Fabry | A01M 1/026 43/114 |
| 8,808,721 B2 | 8/2014 | Banfield | |
| 8,931,206 B2 | 1/2015 | Olson et al. | |
| 8,966,812 B2 | 3/2015 | McKnight | |
| 9,901,088 B2 * | 2/2018 | Backmark | A01M 1/2011 |
| 2003/0033965 A1 | 2/2003 | Van Lint | |
| 2004/0216367 A1 * | 11/2004 | Klein | A01M 1/02 43/114 |
| 2005/0138858 A1 * | 6/2005 | Lyng | A01M 1/10 43/121 |
| 2006/0086038 A1 | 4/2006 | Mosher | |
| 2006/0283076 A1 * | 12/2006 | Chambers | A01M 1/14 43/114 |
| 2007/0044372 A1 * | 3/2007 | Lang | A01M 1/023 43/114 |
| 2007/0254907 A1 | 11/2007 | Bowles | |
| 2008/0052982 A1 * | 3/2008 | Windsor | A01M 1/14 43/114 |
| 2008/0115406 A1 * | 5/2008 | Duston | A01M 1/2011 43/131 |
| 2008/0269177 A1 | 10/2008 | Bessette | |
| 2008/0319029 A1 | 12/2008 | Richman et al. | |
| 2009/0145019 A1 | 6/2009 | Nolen et al. | |
| 2009/0145020 A1 | 6/2009 | McKnight | |
| 2009/0223115 A1 | 9/2009 | Lang et al. | |
| 2009/0313883 A1 | 12/2009 | Olson et al. | |
| 2010/0011655 A1 * | 1/2010 | Frisch | A01M 1/14 43/114 |
| 2010/0212213 A1 * | 8/2010 | Hope, III | A01M 1/026 43/123 |
| 2011/0072712 A1 | 3/2011 | Black et al. | |
| 2011/0105333 A1 | 5/2011 | Israels | |
| 2011/0113674 A1 | 5/2011 | Levy | |
| 2011/0203159 A1 | 8/2011 | McKnight | |
| 2011/0289822 A1 * | 12/2011 | Duehl | A01M 1/103 43/113 |
| 2012/0012046 A1 * | 1/2012 | Cain | A01M 1/103 116/200 |
| 2012/0110894 A1 * | 5/2012 | Black | A01M 1/026 43/123 |
| 2012/0186137 A1 * | 7/2012 | Schneidmiller | A01M 1/04 43/121 |
| 2012/0192479 A1 | 8/2012 | Schmitz | |
| 2012/0210628 A1 * | 8/2012 | Park | A01M 1/14 43/114 |
| 2012/0233907 A1 | 9/2012 | Pattison et al. | |
| 2012/0240451 A1 | 9/2012 | Ricks | |
| 2012/0285076 A1 | 11/2012 | Banfield | |
| 2012/0301532 A1 | 11/2012 | Carey et al. | |
| 2013/0031825 A1 * | 2/2013 | Dass | A01M 29/34 43/114 |
| 2013/0067796 A1 | 3/2013 | Dong et al. | |
| 2013/0180161 A1 | 7/2013 | Vasudeva et al. | |
| 2013/0184153 A1 | 7/2013 | Dieleman | |
| 2013/0232849 A1 * | 9/2013 | Schumacher | A01M 1/14 43/114 |
| 2013/0291427 A1 | 11/2013 | Prohaska | |
| 2013/0312313 A1 * | 11/2013 | Lefkowitz | A01M 1/02 43/114 |
| 2014/0020278 A1 | 1/2014 | Smith | |
| 2014/0020280 A1 | 1/2014 | Cullen | |
| 2014/0033597 A1 | 2/2014 | Vasudeva et al. | |
| 2014/0041284 A1 | 2/2014 | Nugent | |
| 2014/0187425 A1 | 7/2014 | Allen | |
| 2014/0290123 A1 * | 10/2014 | Duff | A01M 1/02 43/114 |
| 2014/0311016 A1 | 10/2014 | Wang | |
| 2015/0007485 A1 * | 1/2015 | Hortel | A01M 1/023 43/114 |
| 2016/0316750 A1 | 11/2016 | Gries | |
| 2017/0251655 A2 | 9/2017 | Frutos | |

FOREIGN PATENT DOCUMENTS

| | | |
|---|---|---|
| EP | 0416255 | 3/1991 |
| KR | 20080036963 | 4/2008 |
| KR | 20100092641 | 8/2010 |
| KR | 20130122739 | 11/2013 |
| WO | WO97/24034 | 7/1997 |
| WO | WO2005070209 | 8/2005 |
| WO | WO2008/030385 | 3/2008 |
| WO | WO2009/047584 | 4/2009 |
| WO | WO2009/075839 | 6/2009 |
| WO | WO2012/162703 | 11/2012 |
| WO | 2013/115719 A1 | 8/2013 |
| WO | WO2014/028835 | 2/2014 |
| WO | WO2015/089661 | 6/2015 |

OTHER PUBLICATIONS

Adler et al., Modified Atmospheres. In: Alternatives to pesticides in stored-product IPM, (edited by Subramanyam and Hagstrum), Kluwer Academic Publishers, Boston, pp. 105-146 (2000).

Anderson, J.F. et al., A carbon dioxide, heat and chemical lure trap for the bedbug, *Cimex lectularius*, Medical and Veterinary Entomology, vol. 23, pp. 99-105 (2009).

Barcay, S.J. and Olson, J.F., From Detection through Protection: Solutions for Fighting Bed Bug Infestations, 13 pgs. (2010).

Bayer Environmental Science, Need to Know, Temprid® SC now labeled for Bed Bugs, vol. 7, No. 1, Feb. 18, 2010.

Cardinal Professional Products, ECO2FUME®, http://www.cardinalproducts.com/eco2fume.htm, 2 pages, printed Mar. 30, 2011.

Continental Carbonic, Use Dry Ice to Remove Bed Bugs, http://www.continentalcarbonic.com/dryice/remove-bed-bugs-dry-ice.php, 1 page, printed Sep. 20, 2010.

FMC Corporation, Best Management Practices, Bed Bugs, 2009 (3 pages).

Gries et al., Bed Bug Aggregation Pheromone Finaly Identified, Angewandte Chemie International Edition, Dec. 21, 2014, 5 pages.

Gries et al., Supporting Information Bed Bug Aggregation Pheromone Finaly Identified, Angewandte Chemie International Edition, Dec. 21, 2014, 24 pages.

International Search Report and Written Opinion for PCT/IB2012/052756 dated Jan. 29, 2013.

International Search Report and Written Opinion for PCT/US2015/017115 dated Jun. 1, 2015.

Luckow, Scientists Developing Pheromone-Laced Bed Bug Trap, Pest Control Technology, Jun. 2015, 2 pages.

MGK® Product Code 027911, Material Safety Data Sheet, BedlamTM Insecticide, Feb. 28, 2006 (2 pages).

National Center for Healthy Housing, What's Working for Bed Bug Control in Multifamily Housing: Reconciling best practices with

(56) References Cited

OTHER PUBLICATIONS research and the realities of implementation, undated (3 pages: cover page, table of contents, and p. 22).
Penn State University, Dept of Entomology, Entomological Notes, Bed Bugs, http://ento.psu.edu/extension/factsheets/bedbugs, printed Apr. 13, 2010 (4 pages).
Pest Management Professional, The Business of Bed Bugs, Michael F. Potter, Jan. 1, 2008 (8 pages).
Snell, Eric J., Smith, Todd, Sexton, Wally, Eclosion of Bed Bug (*Cimex lectularius*) Eggs after Exposure to Various Compounds, Snell Scientifics LLC, Meansville, GA, submitted paper at the National Conference on Urban Entomology in Tulsa, OK, May 18-21, 2008 (1 page).
Stern Environmental Group, Bed Bug Control Services for Hotels, Motels, and Apartment Buildings; http://www.sternenvironmental.com/bedbugs/commercial.php, 3 pages, printed Sep. 20, 2010.
Supplementary European Search Report (EP 12 79 6003) dated Feb. 5, 2015 (8 pages).
TARR Status Report, http://tarr.uspto.gov/, Serial No. 77771410, Registration No. 3751703, mark:Bedlam Insecticide, printed Apr. 12, 2010 (2 pages).
Tvedten, Steve, The Bug Stops Here, http://www.getipm.com/thebestcontrol/bugstop/control_bed_bugs.htm, 2 pages, printed Sep. 20, 2010.
www.bed-bug.net, Bed Bug Killer/How to Kill Bed Bugs/Bed Bug Information, printed Apr. 13, 2010 (1 page).
Gangloff-Kaufmann, J.C. et al. (2006) Bed bugs in America: a pest management industry survey. Am. Entomol. 52: 105-106.
Extended European Search Report for Application No. 15809461.5 dated Oct. 19, 2017.
Extended European Search Report for Application No. 15751451.4 dated Dec. 4, 2017.
D.C. Robacker, "Attraction of both sexes of Mexican fruit fly, Anastrepha ludens, to a mixture of ammonia, methylamine, and putrescine," Journal of Chemical Ecology, vol. 19, No. 12, (1993).

\* cited by examiner

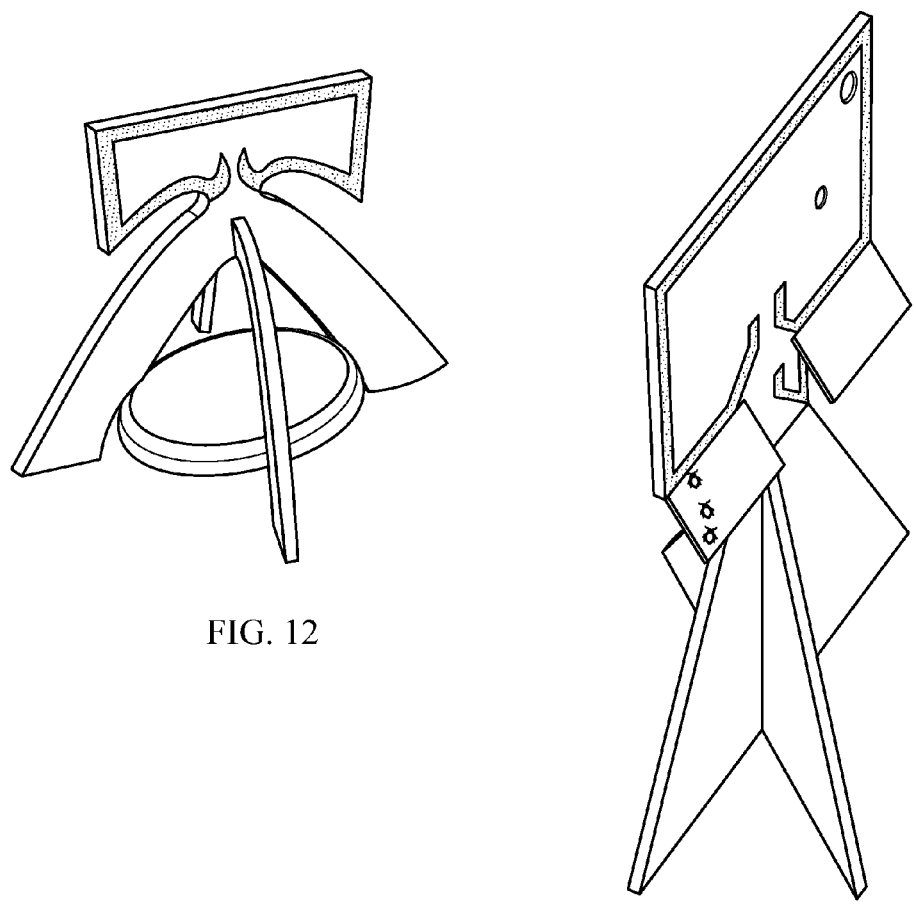
FIG. 12
FIG. 13A
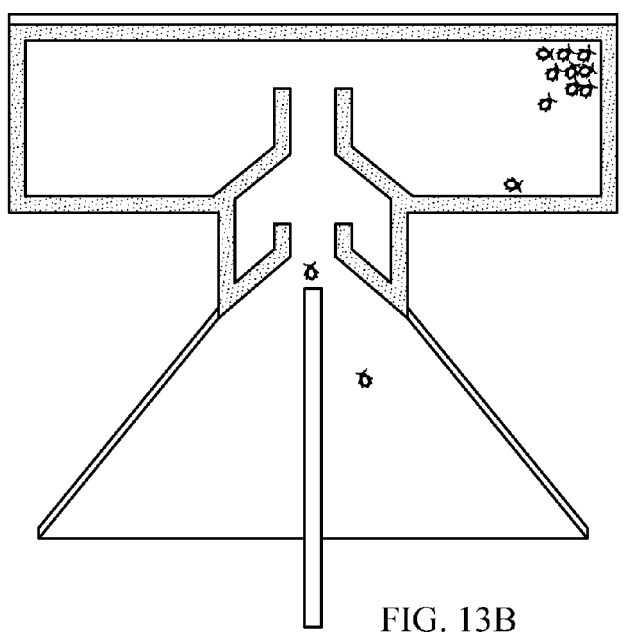
FIG. 13B

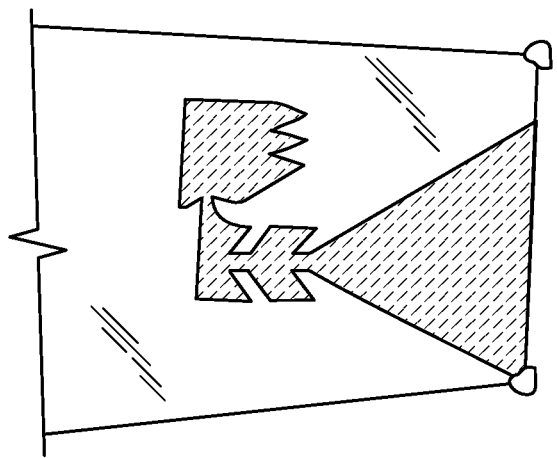
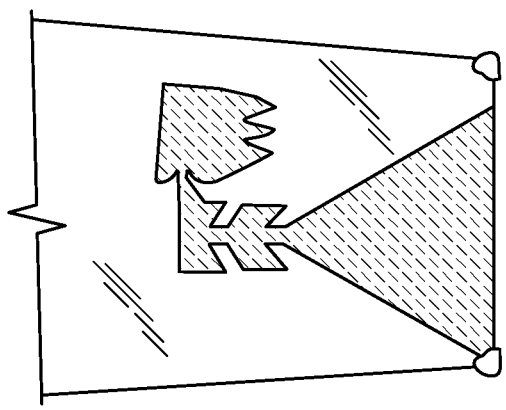
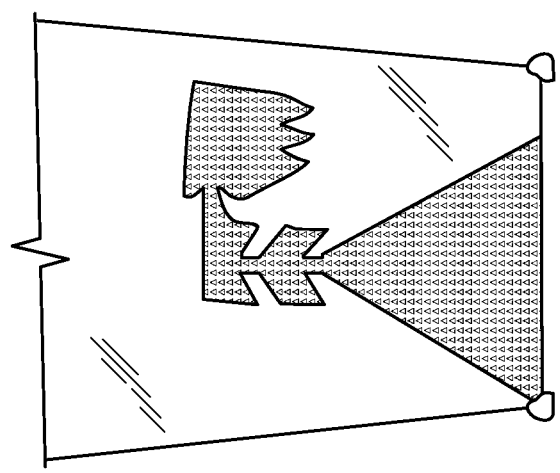

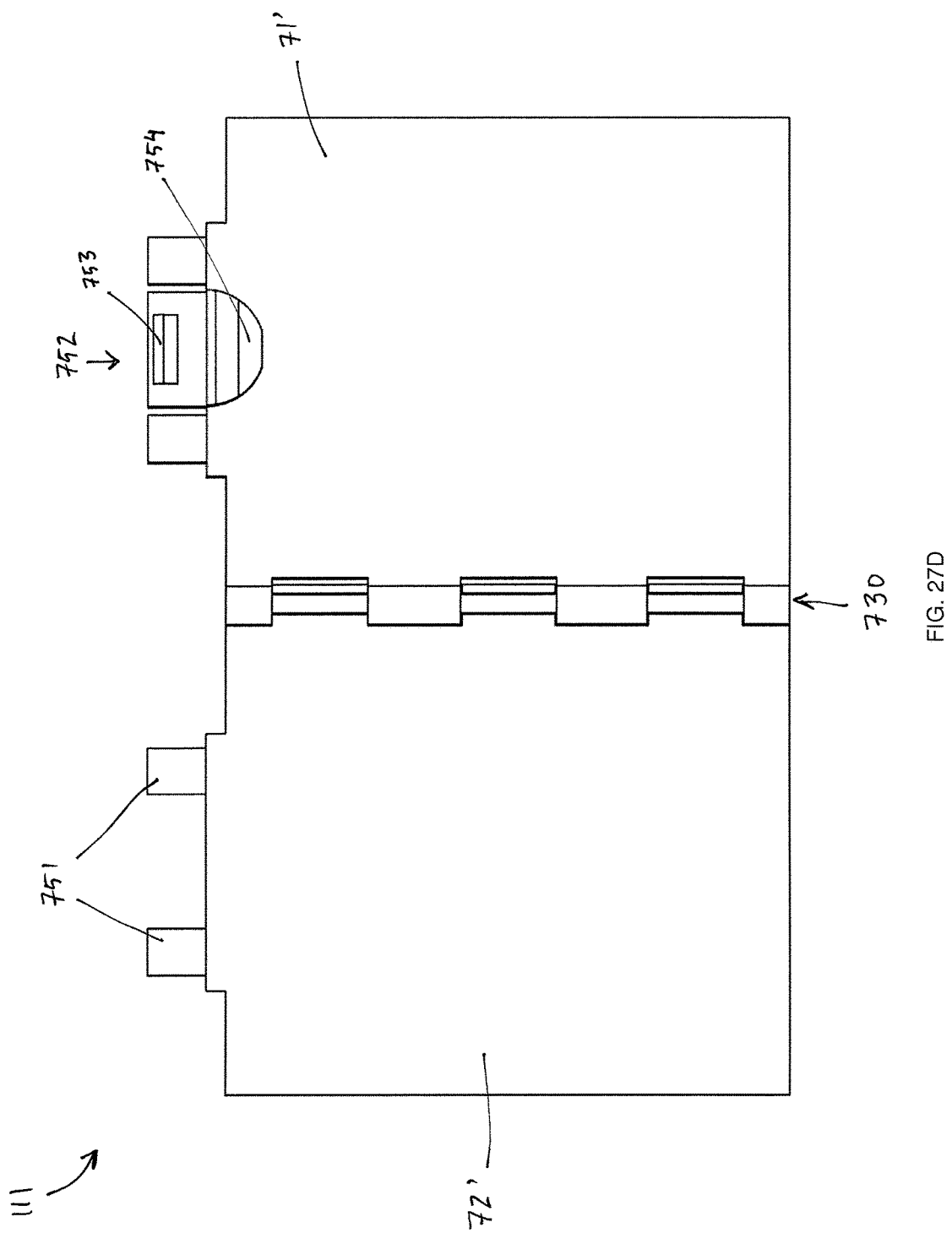

US 10,136,631 B2

BED BUG TRAP AND MONITOR

CROSS-REFERENCE TO RELATED APPLICATIONS

This application claims the benefit of U.S. Provisional Application Ser. No. 61/943,855, filed Feb. 24, 2014, entitled "Bed Bug Trap and Monitor," which is incorporated by reference herein in its entirety.

FIELD

The present disclosure generally relates to the field of pest elimination including elimination of bed bugs. The present disclosure includes devices and methods to trap and immobilize bed bugs as well as monitor their presence in a location.

BACKGROUND

Bed bugs are small parasitic insects that feed solely on the blood of animals. The common bed bug, *Cimex Lectularius*, is adapted to living with humans and prefers feeding on human blood. Bed bugs have lived with humans since ancient times, although many people living in the United States have never seen a bed bug. However, increase of international travel in recent decades has contributed to a resurgence of bed bugs in the United States. Many aspects of bed bugs make their eradication difficult once bed bugs have established a presence in a location.

Adult bed bugs are about ¼ inch or about 4-6 millimeters long, 3-5 millimeters wide, and reddish-brown with oval, flattened bodies. The immature nymphs are similar in appearance to the adults but smaller and lighter in color. Bed bugs do not fly, but they can move very quickly over surfaces. Female bed bugs lay their eggs in secluded areas and can deposit up to five eggs per day, and as many as 500 during a lifetime. The bed bug eggs are very small, about the size of a dust spec. When first laid, the eggs are sticky, causing them to adhere to surfaces. The eggs hatch in about one to three weeks and go through five nymphal stages before reaching maturing in about 35-48 days.

Bed bug infestations originate by a bed bug being carried into a new area. Bed bugs are able to cling to possessions and hide in small spaces so that they may easily be transported in a traveler's belongings or in furniture being moved. As a result, buildings where turnover of occupants is high, such as hotels or apartments, are especially vulnerable to bed bug infestations.

Bed bugs prefer to hide close to where they feed and will typically find a shelter or hiding place, such as a small crack or crevice, in or around a bed or couch. The bugs may spend most of their time in hiding and only leave the shelter every 5-7 days to feed. Bed bugs are mainly active during the nighttime, making them hard to detect. Bed bugs find easy hiding places in beds, bed frames, furniture, along baseboards, in carpeting, behind loose wall paper, and countless other places. Once established in a location, bed bugs tend to congregate but do not build nests like some other insects.

Infestations are not likely to be eliminated by leaving a location unoccupied as bed bugs can survive long periods of time without feeding. Adult bed bugs can persist months without feeding, and in certain conditions even up to a year or more. Nymphs can survive weeks or months without feeding.

Bed bugs obtain their sustenance by drawing blood through an elongated beak. They may feed on a human for 3 to 10 minutes, although the person is not likely to feel the bite. After the bite, the victim often experiences an itchy welt or swelling in the area of the bite. However, some people do not have any reaction or only a very small reaction to a bed bug bite. Bed bug bites have symptoms that are similar to other insect bites, such as mosquitoes and ticks. It is not possible to determine whether the bite is from a bed bug or another type of insect without actually observing the bed bug. As a result, bed bug infestations may go long periods without being detected.

Bed bugs are difficult to eradicate, particularly with 100% efficacy, because of their tendency to hide, their ability to survive long times without food, and the small size of the eggs. It is against this background that the present disclosure is made.

SUMMARY

The present disclosure relates to a trapping device for capturing crawling insects, such as bed bugs. The trapping device comprises a textured two-dimensional surface with one or more triangular entrance areas, where one of the triangular sections comprises a base, one or more wing sections, each wing section being connected to either one or more triangular sections or to another wing section by a neck; and a collecting area connected to one or more wing sections by a bridge. The trapping device can further comprise a support structure, and can be enclosed in a case with one or more entrances. The trapping device can also comprise a catching area that can optionally include an adhesive for immobilizing the insects.

BRIEF DESCRIPTION OF DRAWINGS

FIGS. 12-22H and FIGS. 22J-26E show prototypes of embodiments of the trapping device of FIG. 1.

FIG. 27D is a back view of the trapping device of FIG. 27A.

DETAILED DESCRIPTION

Pest removal services are often called upon to eradicate bed bugs in infested locations such as homes, hotels, offices, or theaters. Because of the characteristics of bed bugs, particularly the tendency to hide, nocturnal activity, and resistance to some treatments, infestations may be hard to detect and eliminating the infestation may take several visits and consecutive treatments. The device and method of this disclosure provide for an improved way to trap and hold crawling (i.e., non-flying) bugs, such as bed bugs, ticks, mites, ants, and other crawling arthropods, to monitor their presence and activity in the area, and to help eliminate bug infestations.

Bed bugs have a tendency to hide in small spaces, such as cracks and crevices between parts of furniture, upholstery, wall paper and other wall materials, carpeting, etc. Bed bugs exhibit a searching behavior and often crawl up vertical surfaces during searching. According to an embodiment, bed bugs can be captured in a trapping device taking advantage of the bug's natural behavior. The trapping device can be configured so that the bugs have difficulty finding their way out, getting trapped in or on the trapping device. The trapped bugs can then be eliminated from the infested area. In an alternative embodiment the trapping device can be used to monitor the presence, activity, and/or prevalence of bugs in an area.

Figure 1A:
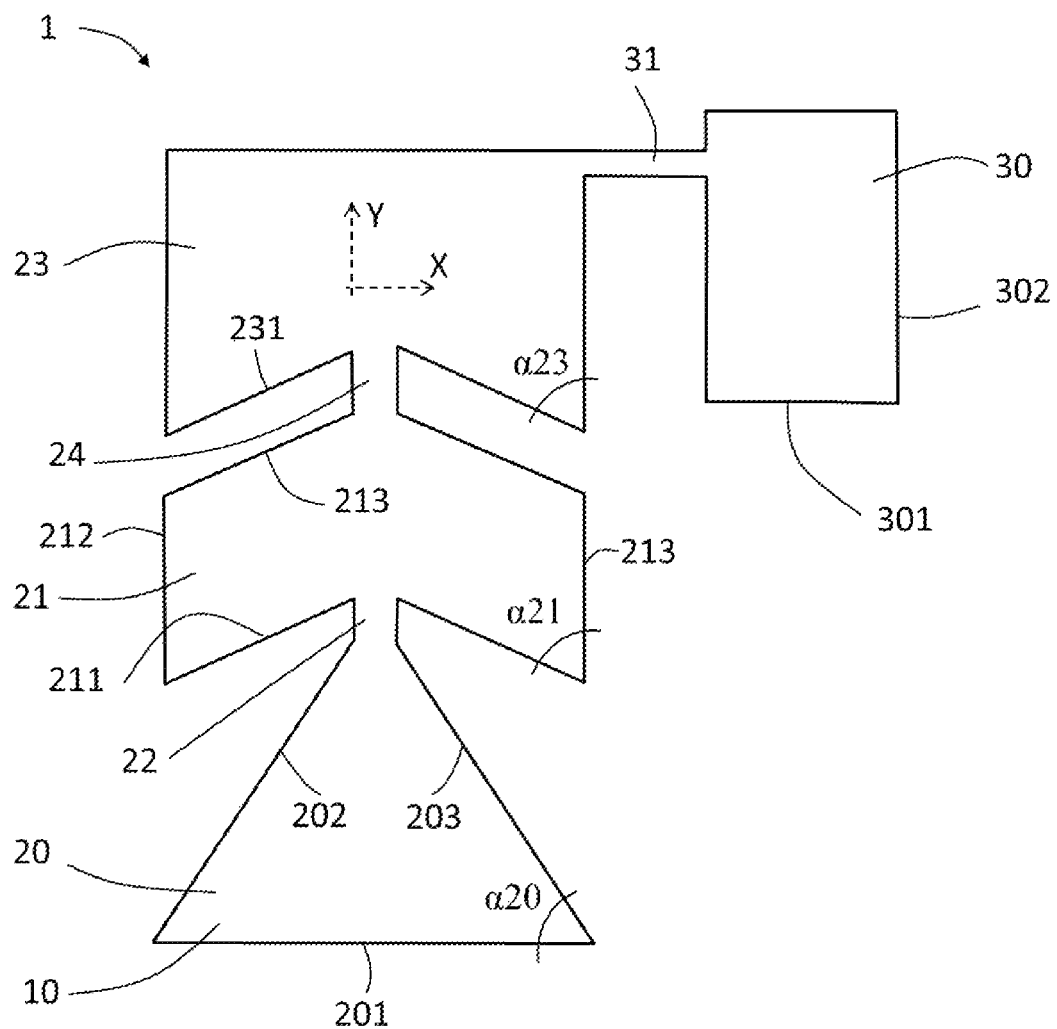
FIG. 1A shows an embodiment of a trapping device according to the present disclosure.

FIG. 1A shows an embodiment of the trapping device 1 according to an embodiment. The trapping device 1 can comprise a two-dimensional surface that is suitable for bugs to crawl on. For example, the trapping device 1 can comprise a surface 10 defining an X,Y-plane, the surface 10 having a surface texture that facilitates bugs crawling on it without falling off. The shape of the surface 10 can be designed to keep the bugs that enter the trapping device 1 on the surface, and to minimize bugs crawling off of the surface 10, i.e., to trap the bugs on the surface 10. The trap surface 10 can be surrounded by another surface (e.g., a second surface 510, shown in FIG. 8) that is not favored by bugs or is not suitable for bugs to crawl on. The surface materials can be selected so that the bugs favor the trap's surface 10 over the second surface 510. For example, the second surface 510 can be smooth, lacking adequate texture for the bugs to get a foot hold on the second surface 510.

As shown in FIG. 1A, the trapping device 1 has a triangular or funnel-shaped base (i.e., base funnel 20), a bottom edge 201, and side walls 202. The base funnel 20 tapers toward the top, connecting to a first wing section 21 by a narrowing or a first neck 22. The first wing section 21 can further be connected to a second wing section 23 by a second neck 24. The trapping device 1 may comprise additional wing sections connected to each other by narrower sections or necks. For example, the trapping device 1 may comprise 1-5 wing sections, 1-3 wing sections, or 2 or 3 wing sections. At least one wing section (e.g., the second wing section 23) is further connected to a collecting area 30 by a bridge 31. For example, the topmost wing section can be connected to the collecting area 30. In alternative embodiments, more than one wing section can be connected to the collecting area 30, or the trapping device 1 may comprise more than one collecting area. The bridge 31 can be horizontal or angled relative to the X-axis in the in the X,Y-plane. The shape of the collecting area 30 can be any suitable shape, such as a rectangle, a rounded rectangle, or a rectangle with an irregular bottom edge 301.

The edges 202 of the base funnel 20 are angled as defined by angle α20. According to an embodiment, the angle α20 is in a range of about 30°-75°, or about 40°-65°. The bottom edge 201 of the base funnel 20 is substantially horizontal and can be aligned with a horizontal surface (e.g., floor) when the trapping device 1 is in use. The first and second wing sections 21, 23 may comprise angled bottom edges (211 and 231, respectively), having an angle α21, α23, respectively, as measured from the side edge 212, 232 of the wing section 21, 23, respectively. The angles α21 and α23 can be in a range of about 30°-90°, or about 40°-75°. The angles α21 and α23 can be independently selected. The wing sections may also have an angled top edge (e.g., top edge 213) that may be parallel to the bottom edge (e.g., bottom edge 211). Alternatively, the angle of the top edge 213 may be independently selected. In the exemplary embodiments shown, the top edge 213 is parallel with the bottom edge 211 of the first wing section 21 and the bottom edge 231 of the second wing section 23. In a preferred embodiment, the top edge 213 has an angle that guides the bugs toward the second neck 24 and the second wing section 23.

The trapping device 1 can be manufactured of any suitable material that allows for bugs to crawl on the surface 10 of the trapping device 1. For example, the surface 10 can comprise paper, paper board, cardboard, the "loop"-side of hook-and-loop material, fabric, felt, wood, fiberboard, fiberglass, or other animal, plant, mineral, or synthetic fibrous materials, and combinations thereof. Preferably the material of the surface 10 has a textured surface that allows for bugs, such as bed bugs, to get adequate foot hold of the surface 10 to be able to crawl across the surface 10 when the surface 10 is in a vertical or substantially vertical position. For surfaces 10 constructed of paper, a coarse textured paper is preferred. For example, the coarseness of the paper may be similar to or coarser than that of brown construction paper. The material may be woven or non-woven. The surface 10 of the trapping device 1 may be any color. The trapping device 1 may, for example, be a non-white color having an L* value of 90 or less on the CIE L*, a*, b* scale.

Figure 1B:
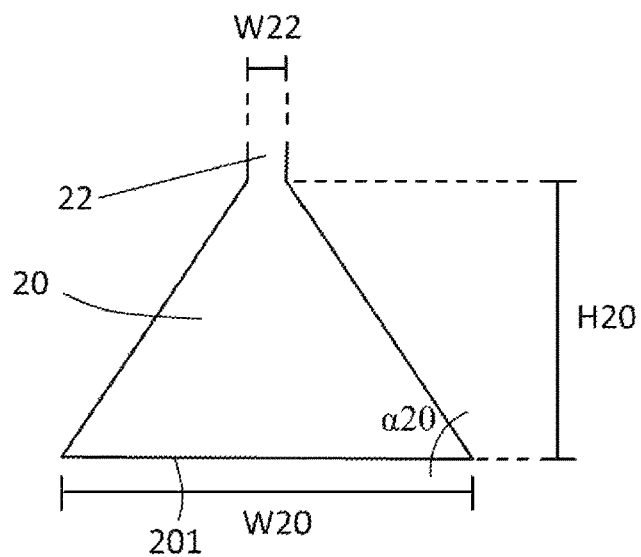
FIG. 1B shows a detail view of the base funnel of the trapping device of FIG. 1.

A detailed view of the base funnel 20 is shown in FIG. 1B. The base funnel 20 has a width W20 at the bottom edge 201 that narrows to width W22 at the neck 22, and a height H20. The width 20 can be any suitable width, and can be, for example, in the range of about 4-12 cm, or about 5-10 cm, or about 6-8 cm. The height H20 is partially defined by the width W20 and the angle α20, and can be, for example, in the range of about 3-10 cm, or about 4-8 cm. The width W22 can be about 0.3-2 cm, or about 0.4-1.5 cm, or about 0.5-0.8 cm. A suitable width W22 will act to guide insects to enter the next section (e.g., a first wing section 21) of the trapping device 1, and will discourage insects from exiting the trapping device 1. The second neck 24 can have a similar width as width W22 of the first neck 22.

The trapping device 1 can be placed in a location so that the bottom edge 201 aligns with a surface the insects are on (e.g., a floor, a wall, or a surface on a piece of furniture) and allows for insects to crawl up the surface of the trapping device. Bed bugs in particular have a tendency to crawl up vertical surfaces and to follow the edge of a surface. As the base funnel 20 narrows toward the first neck 22, the bugs are guided along the surface 10 by the side edges 202, 203 into the first wing section 21. The insects can be further guided into subsequent wing sections (e.g., a second wing section 23), and finally into the collecting area 30. Once in the collecting area 30, the insects may not find their way back out onto the base funnel 20 and off the trapping device 1. Although most insects will stay on the collecting area 30, a catching area 310 (shown in FIG. 5, alternatively catching area 742 in FIG. 9) may be arranged below the collecting area 30 to catch any insects that fall off of the collecting area 30. The catching area 30 may be, for example, shaped as a platform or a trough and may comprise a glue or adhesive to prevent insects from exiting the catching area 30.

Figure 2:
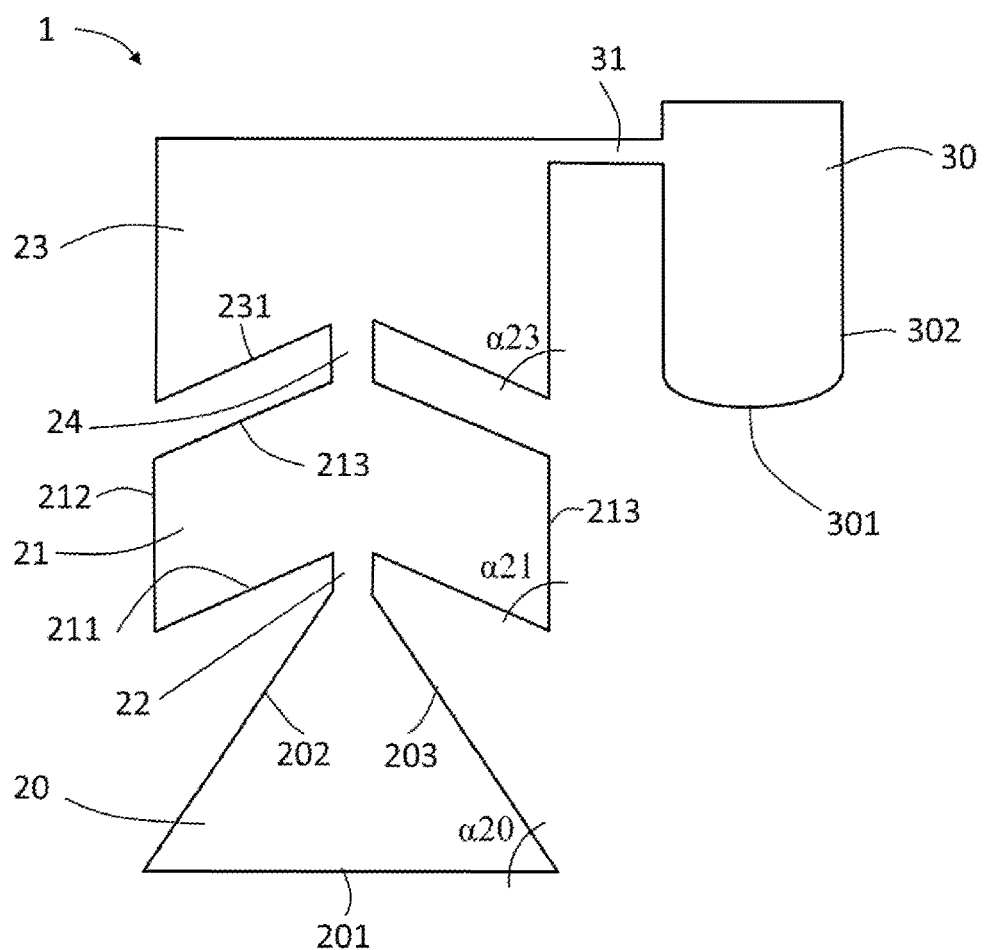
FIG. 2 shows an alternative embodiment of the trapping device of FIG. 1.
Figure 3:
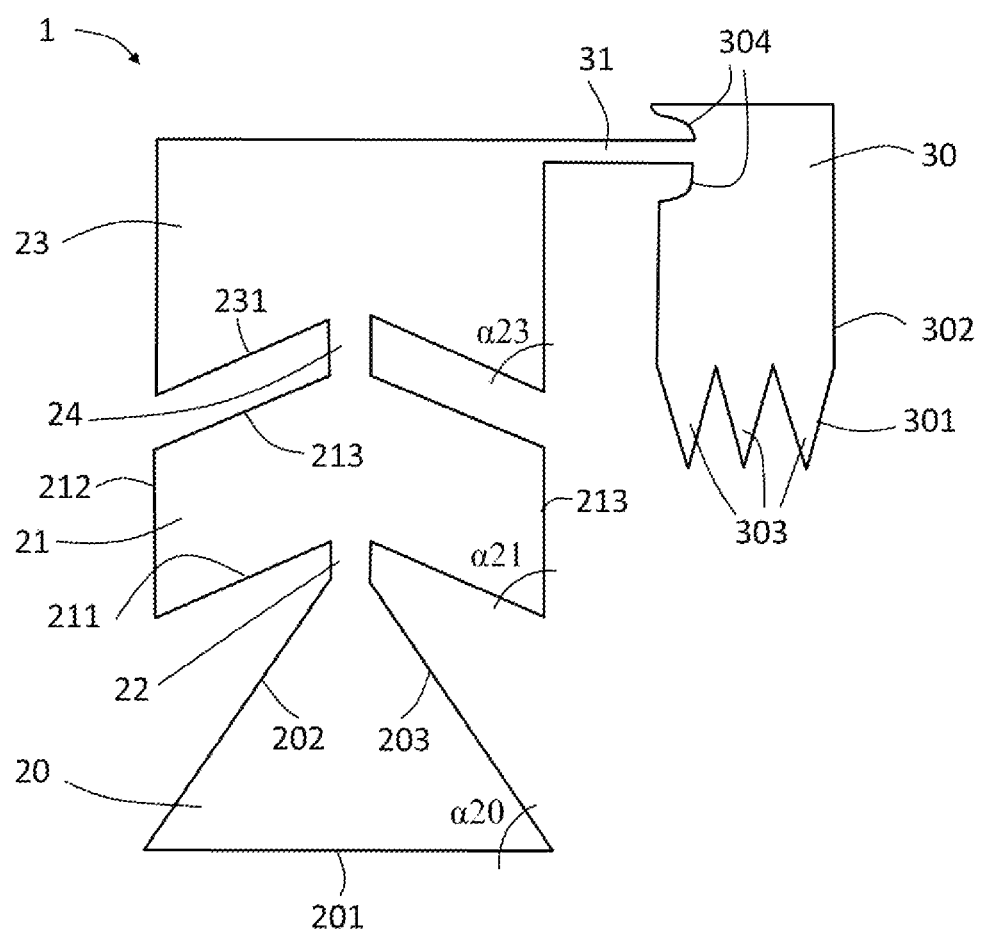
FIG. 3 shows an alternative embodiment of the trapping device of FIG. 1.

Embodiments of the trapping device 1 with alternative designs for the collecting area 30 are shown in FIGS. 2 and 3. The collecting area 30 may have a rectangular design, or may have a rounded bottom as in FIG. 2. Alternatively, the bottom edge 301 of the collecting area 30 may be configured to encourage insects to stay in the bottom area of the collecting area 30. As seen in FIG. 3, the bottom edge 301 may comprise pointed extensions 303 extending downward from the collecting area 30. The pointed extensions 303 take advantage of the natural behavior of bed bugs to explore such areas on a surface, leading more bugs to collect in the bottom area of the collecting area 30.

The collecting area 30 may further comprise recesses 304 on one or both sides of the entrance into the collecting area 30 through the bridge 31. The recesses 304 act to deter insects from leaving the collecting area 30.

Figure 4:
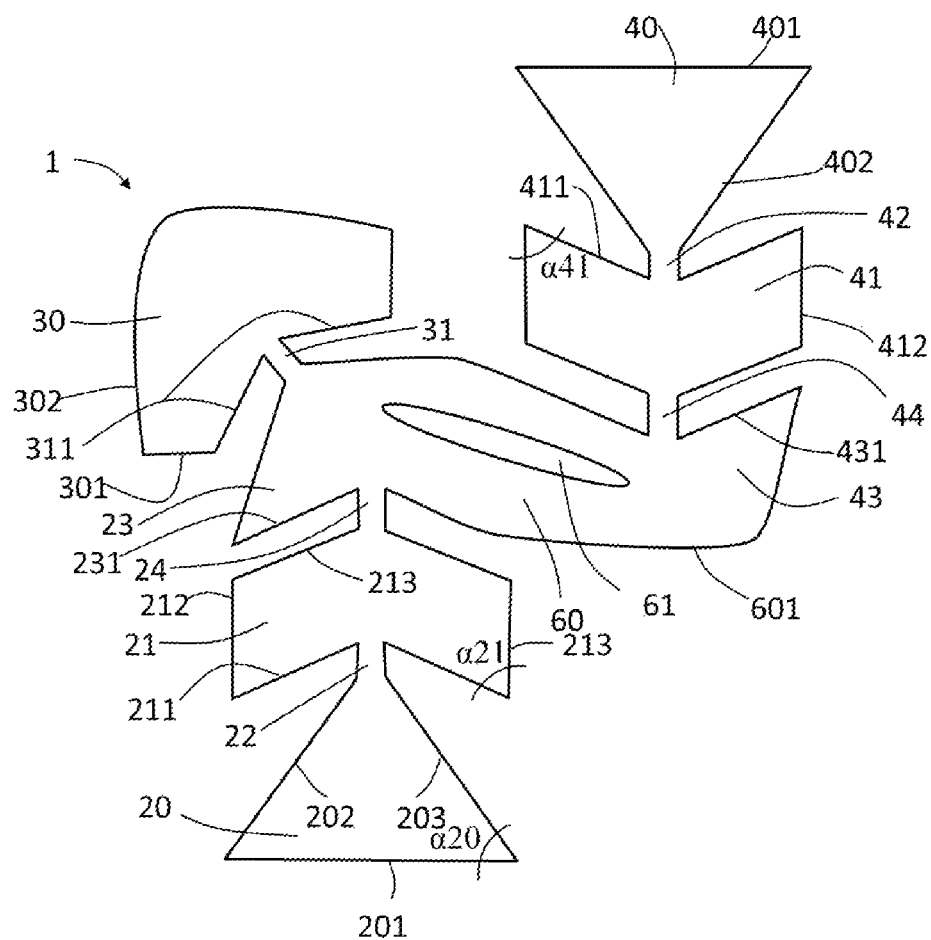
FIG. 4 shows an alternative embodiment of the trapping device of FIG. 1.

An embodiment of the trapping device 1 is shown in FIG. 4, where the trapping device 1 comprises two entrance areas, the base funnel 20 and a top funnel 40. The second entrance area may have a similar or corresponding (but inverted) shape as the first entrance area. In the exemplary embodiment in FIG. 4, the second entrance area comprises a top funnel 40, a first wing section 41 connected to the top funnel 40 by a neck 42, and a second wing section 43 connected to the first wing section 41 by a second neck 44. The first and second entrance areas are connected by a connecting section 60 that may have in it a cut-out 61. The cut-out 61 serves to guide the insects from the entrance areas into the collecting area 30. The edges 601 of the connecting section 60 may be rounded so as to encourage insects to move along the edge. The overall shape, configuration, and dimensions of the trapping device 1 are configured to (a) guide the insects into the collecting area 30, (b) make it difficult for the insects to exit the collecting area 30, or (c) to discourage insects from staying or entering back into other areas of the trapping device 1.

Figure 5:
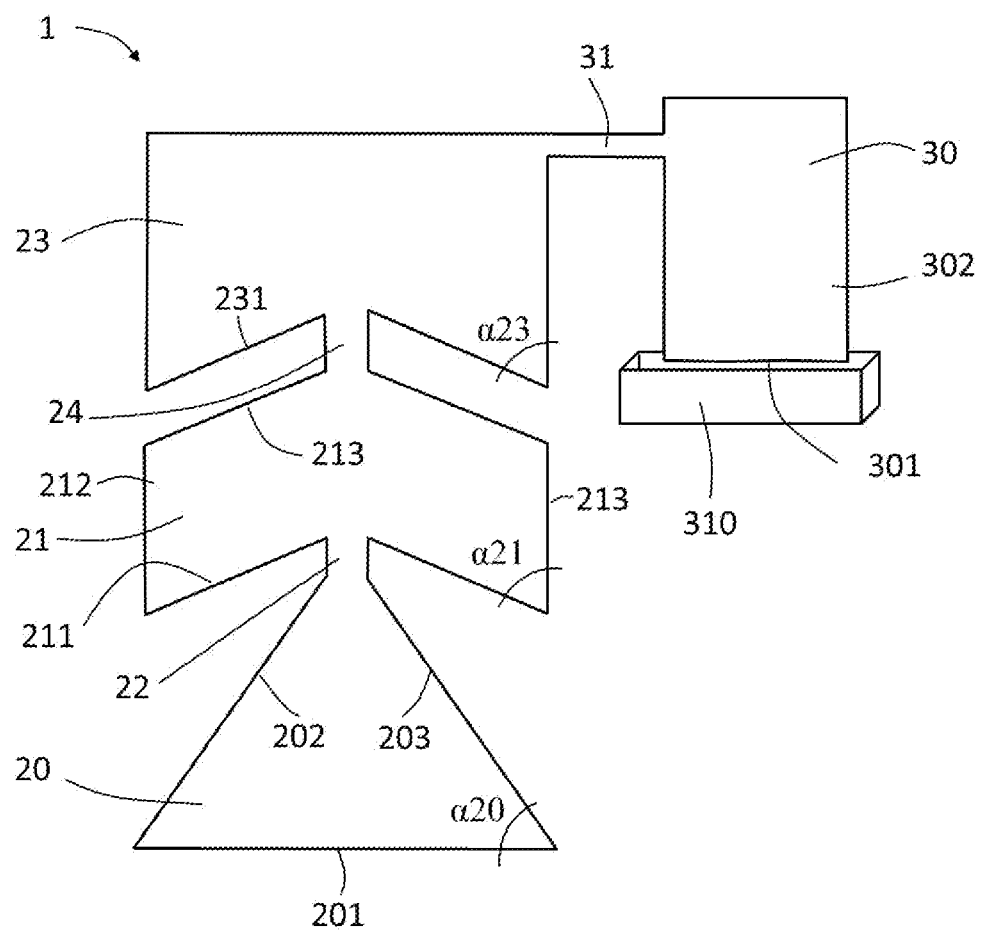
FIG. 5 shows an alternative embodiment of the trapping device of FIG. 1.
Figure 9:
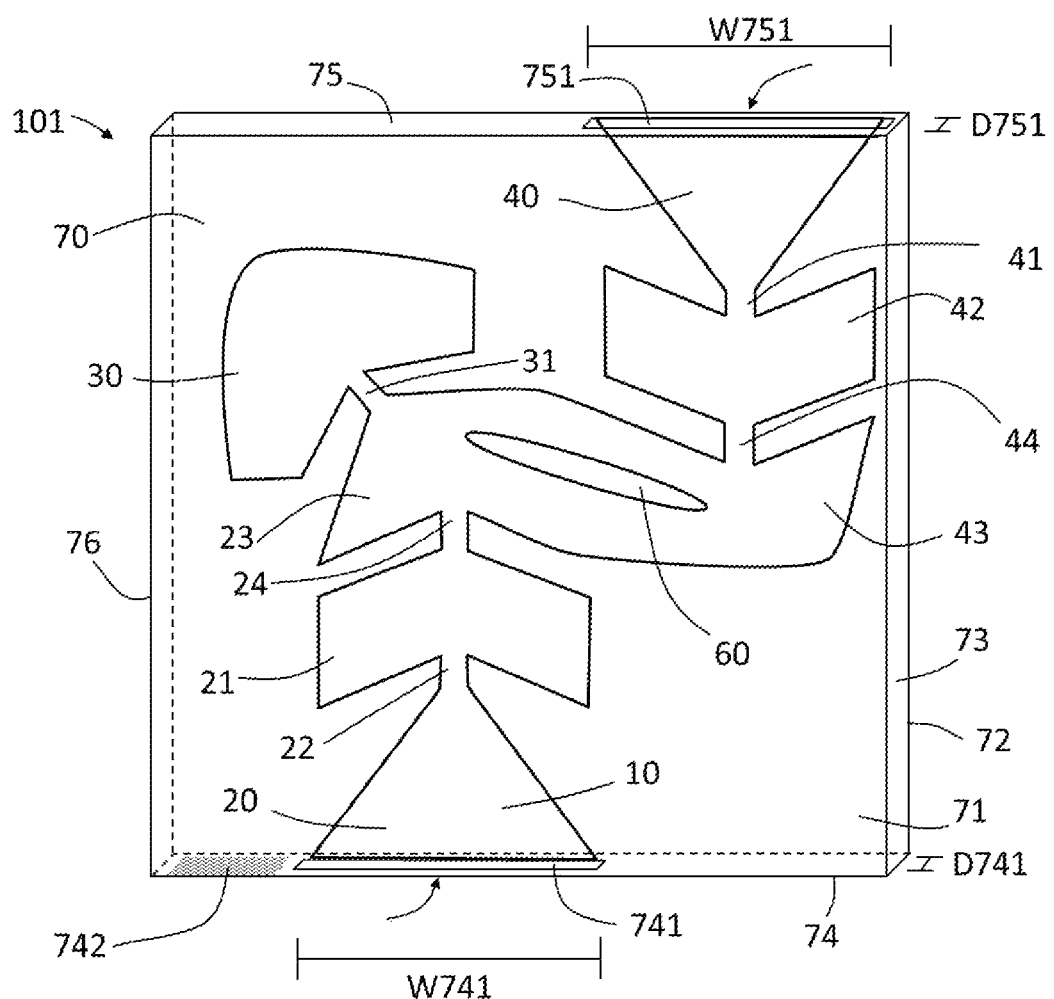
FIG. 9 shows the trapping device of FIG. 4 with a case according to an embodiment.

FIG. 5 shows an embodiment of the trapping device 1 having a catching area 310 for catching insects that may fall off of the collecting area 30. The catching area 310 is configured to catch and retain insects that fall off the collecting area 30. The catching area 310 may be any suitable shape, such as a trough, a cup, or a flat platform or a pad, and may comprise an adhesive material, such as glue or other adhesive or tacky material. A pad-type catching area 742 is shown in FIG. 9.

The trapping device 1 can further comprise an insecticide or other compound designed to kill or immobilize insects. The insecticide can be incorporated, for example, into collecting area 30 or the catching area 310 or 742 (e.g., into the adhesive material in the catching area 310 or 742), or into another part of the trapping device 1, 101.

Figure 6:
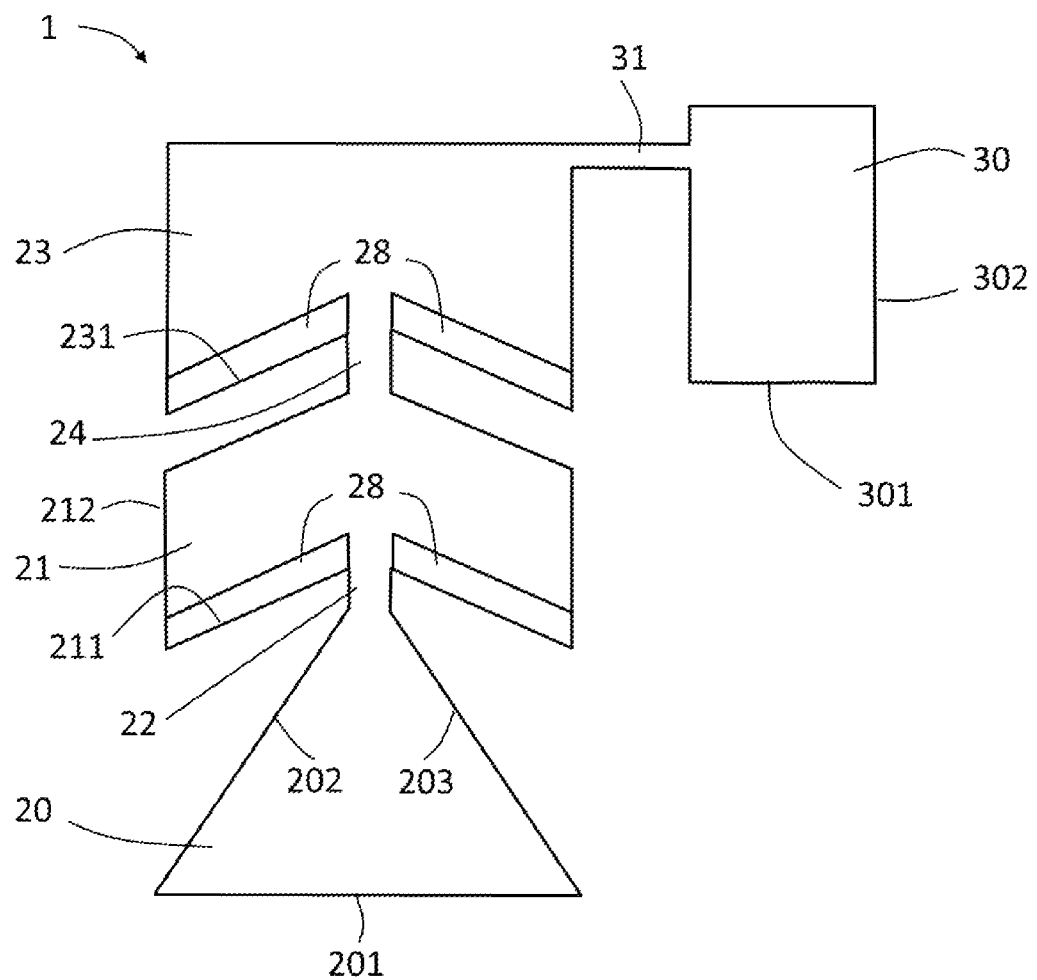
FIG. 6 shows an embodiment of the trapping device of FIG. 1.

Insects can further be discouraged from entering certain parts of the trapping device 1. For example, as shown in FIG. 6, the trapping device 1 may comprise repellent strips 28 along the bottom edges 211, 231 of the wing sections 21, 23. Repellent strips 28 can be included in other configurations of the trapping device 1, as well. For example, the trapping device 1 in FIG. 4 may include repellent strips 28 (not shown in FIG. 4) at edge 211 of the first wing section 21, edge 231 of the second wing section 23, the corresponding edges 411 and 431 of wing sections 41 and 43, and edges 311 of the collecting area 30. The repellent strip 28 may comprise a material that the insects prefer not to walk on, or prefer not to come into contact with. For example, a tacky or glue-like adhesive material (e.g., an epoxy or urethane based adhesive material) has been found to cause the majority of bed bugs to turn away from the area. Other suitable materials may also be used. The purpose of the repellent strip 28 is to keep insects from entering too close to the bottom edge 211, 231 and falling off of the trapping device 1.

Figure 7A:
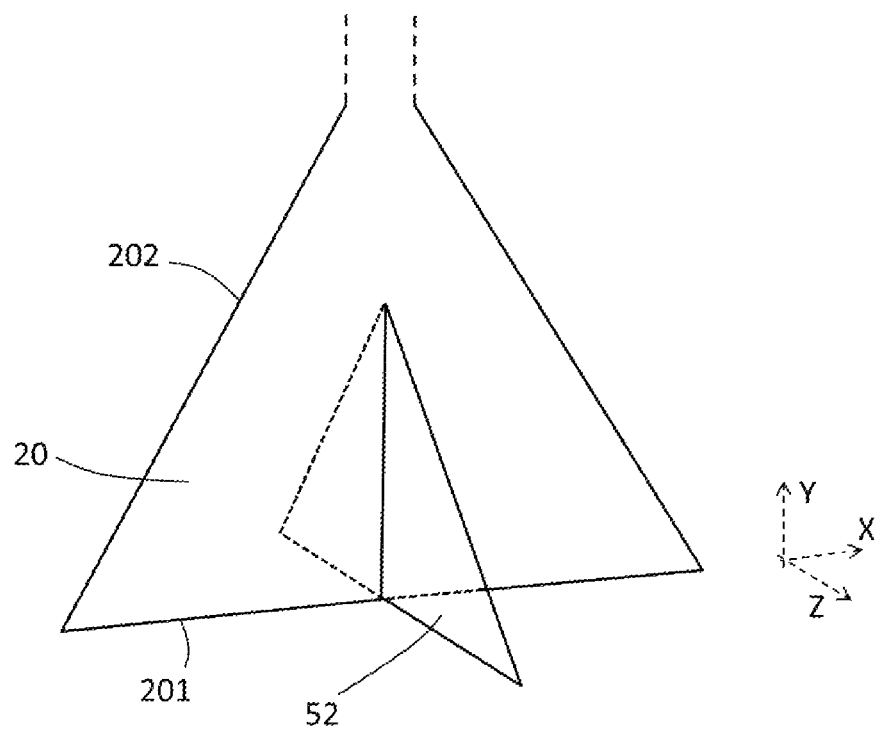
FIG. 7A shows an embodiment of a support structure for the trapping device of FIG. 1.
Figure 7B:
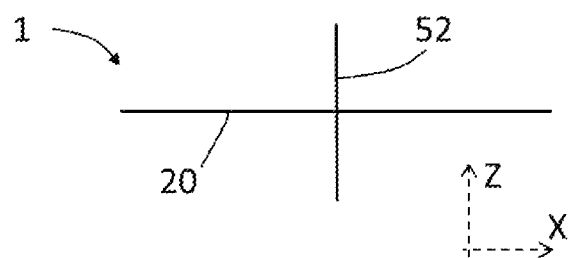
FIG. 7B shows an embodiment of a support structure for the trapping device of FIG. 1.
Figure 8:
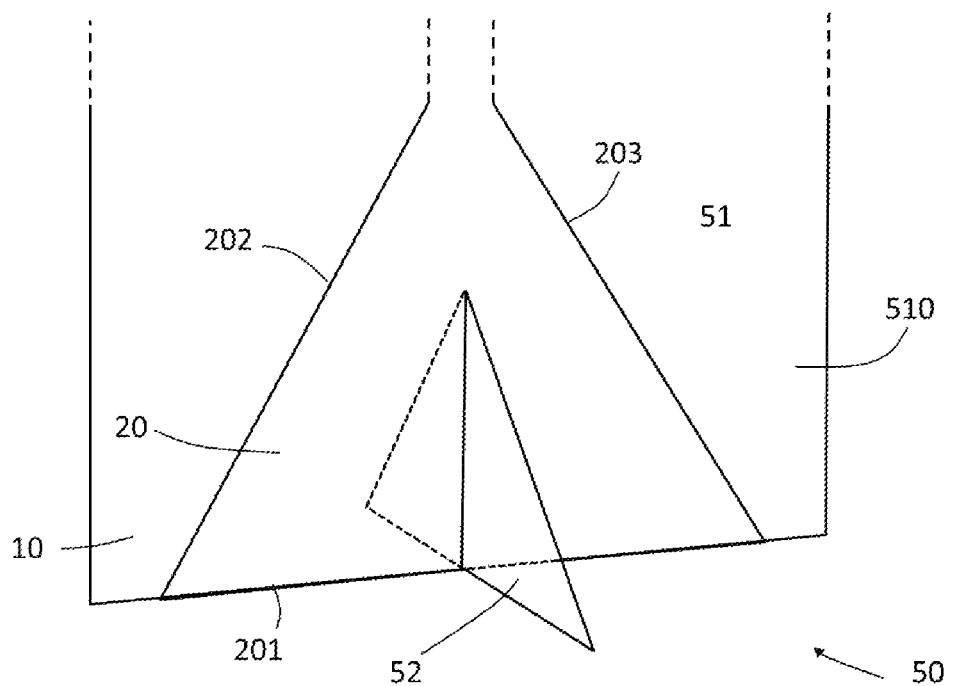
FIG. 8 shows an embodiment of a support structure for the trapping device of FIG. 1.

The trapping device 1 may be supported by a support structure 50. The support structure 50 may be any structure that facilitates holding the trapping device 1 in an upright or vertical position. The term "vertical" is used here to include positions that are approximately or nearly vertical, e.g., positions that deviate up to ±20° from a vertical position. Exemplary embodiments of the support structure 50 are shown in FIGS. 7A, 7B, and 8. As shown in FIG. 7A, the support structure 50 may comprise a support foot 52. The support foot 52 can be a piece of material that is positioned in another plane, e.g., the Z-plane relative to the surface 10 that defines the X,Y-plane. The support foot 52 can be positioned in an angle (e.g., about 90°) relative to the base funnel 20 and together with the bottom edge 201 of the base funnel 20 defines a support area, e.g., a cross-shaped support area in the X,Z-plane, shown in the top view of the trapping device 1 in FIG. 7B. If the trapping device 1 is provided as a kit, the support foot 52 may be provided as a separate piece of material of suitable dimensions having a slot that the user can slide into a corresponding slot in the base funnel 20 to provide the support structure 50 for the trapping device 1. In the exemplary embodiment, a triangle-shaped support structure 50 is shown, but the support structure may have any suitable shape and is not limited to regular geometric shapes (e.g., triangles and rectangles). The support structure 50 may also be formed by other than flat/planar pieces of material, such as a cylinder or a cone, or may comprise a cast or molded structure or a structure constructed of wire or tubing. The support structure 50 may also be constructed for supporting the trapping device on a non-horizontal surface, such as against a piece of furniture. In one exemplary embodiment, the support structure 50 can be wrapped around a portion of a piece of furniture (e.g., the leg or post of a bed or a sofa).

The support structure 50 may also comprise a support plate 51 as shown in FIG. 8. The support plate 51 can comprise a backing for the trapping device 1. The support plate may comprise a material having suitable stiffness to act as a backing for the trapping device 1, and may have a surface 510 that bed bugs tend to avoid, e.g., a surface with a smooth texture. For example, the surface 510 may comprise a smooth plastic, glass or metal surface. A support plate 51 can be used without or in combination with a support foot 52.

Other elements of the trapping device 1 can also exist in three-dimensional configurations. For example, one or more of the wing sections 21, 23 or the collecting area 30 can be configured in a plane other than the X,Y-plane. In an exemplary embodiment, the collecting area 30 may be configured horizontally in the X,Z-plane.

According to an embodiment shown in FIG. 9 the trapping device 101 can comprise a case 70 that surrounds the surface 10. In a preferred embodiment, the trapping device 101 comprises a case 70 with two or more entrance openings 741, 751 aligned with two or more entrance areas (e.g., base funnel 20 and top funnel 40) through which insects can enter the trapping device 101. The case 70 is defined by a front wall 71, a back wall 72, side walls 73, 76, a bottom 74, and a top 75. Some or all of the walls 71, 72, 73, 74, 75, 76 can be transparent, allowing for inspection of the trapping device 101 for insects without opening or taking apart of the trapping device 101. In the exemplary embodiment shown in FIG. 9, the entrance openings 741, 751 are on the bottom 74 and the top 75 of the trapping device 101. The entrance opening 741 has a width W741 that corresponds to the width W20 of the base funnel 20. The entrance opening 751 has a width W751 that corresponds to the width W40 of the top funnel 40. The depth D741, D751 of the entrance opening 741, 751 is configured to allow the targeted insects (e.g., bed bugs) to fit through the opening. The depth D741, D751 can be, for example, about 3-10 mm, or about 4-6 mm.

The case 70 may be constructed of any suitable material, such as plastic, glass, metal, or a combination thereof. The case 70 may, for example, be constructed of polyacrylic (e.g., polymethyl methacrylate), polyethylene, polypropyl, polycarbonate, or any other suitable plastic. According to some embodiments, some or most parts of the case 70 are opaque. In some preferred embodiments, some or more parts of the case 70 have a dark color, such as black, dark grey, dark brown, dark blue, dark green, dark red, etc.

The bottom 74 of the case 70 may comprise a catching area 742 for catching insects that fall off of the surface 10, particularly from the collecting area 30. The catching area 742 may be a treated surface on the bottom 74 on the inside of the case 70. The catching area 742 may comprise an adhesive or glue or other means for catching and retaining or immobilizing insects. For example, the catching area 742 may comprise an insect immobilization adhesive, such as the Tangle-Trap adhesive coatings available from Contech, Inc. in Victoria, BC, Canada. The case 70 may be provided with a mechanism for exchanging the adhesive of the catching area 742 when the adhesive becomes spent or otherwise unusable. For example, the adhesive can be contained in an adhesive member that can is removable and replaceable. Further, the surface 10 may also be removable and replaceable. For example, the material of the surface 10 can be adhered to the inside back wall 72 of the case 70 by a removable adhesive. In contrast to the rest of the case 70, the catching area 742 may be light in color. In an exemplary embodiment, the catching area 742 is white.

The case 70 may comprise a support structure and/or mounting structure for holding the trapping device 101 in an upright or vertical position. The back wall 72 of the case may act as a support plate 52 for the surface 10. The case 70 may be provided with one or more support feet 51 or another support mechanism to facilitate holding the trapping device 101 upright. The case 70 may further include a mounting means that can be used to fix the trapping device 101 into place on a surface such as a wall or the surface of a piece of furniture, such as a headboard, a book case, or a dresser. The mounting means may comprise, for example, hardware such as screws, bolts, nails, clips, etc., or adhesive pads such as epoxy or urethane adhesives, or hook-and-loop type fasteners.

Figure 10:
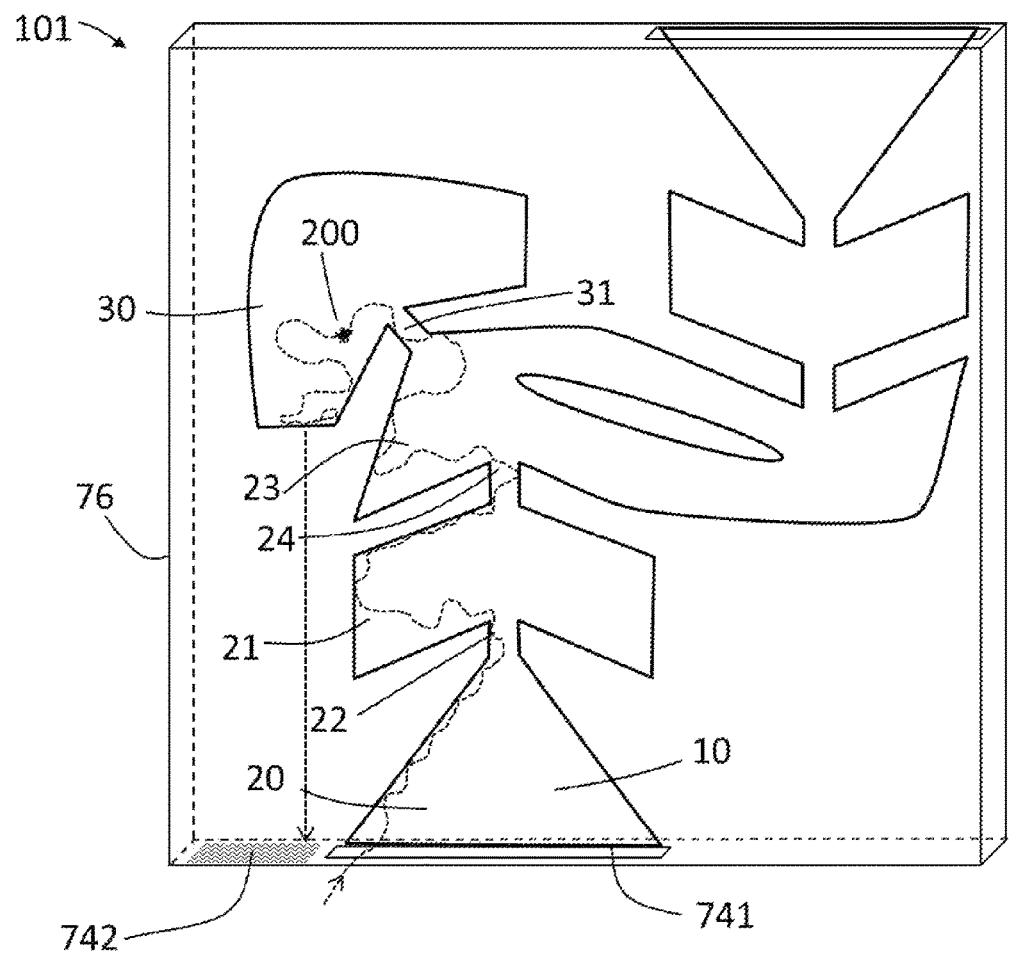
FIG. 10 shows a cartoon depiction of the trapping device of FIG. 9 in use.

FIG. 10 show a cartoon depiction of the functioning of the trapping device 101. According to the embodiments, a bed bug 200 can enter the case 70 through one of the entrance openings 741, 751 (e.g., the bottom entrance opening 741 as shown). The bed bug 200 may crawl around on the surface 10, and according to its natural behavior, tend to move mostly upward and avoid going over the edges of the surface 10 onto the material of the case 70. The bed bug 200 will thus be guided to move from the base funnel 20 to the first wing section 21, and from there to the second wing section 23. The second wing section 23 is designed to guide the insect toward the collecting area 30. Once in the collecting area 30, the bed bug 200 may either stay in the collecting area 30, or may find its way to the bottom of the collecting area 30 and fall off of the surface 10. If the bed bug 200 falls off of the surface 10, it will come into contact with and be immobilized by the adhesive material in the catching area 742.

Figure 11:
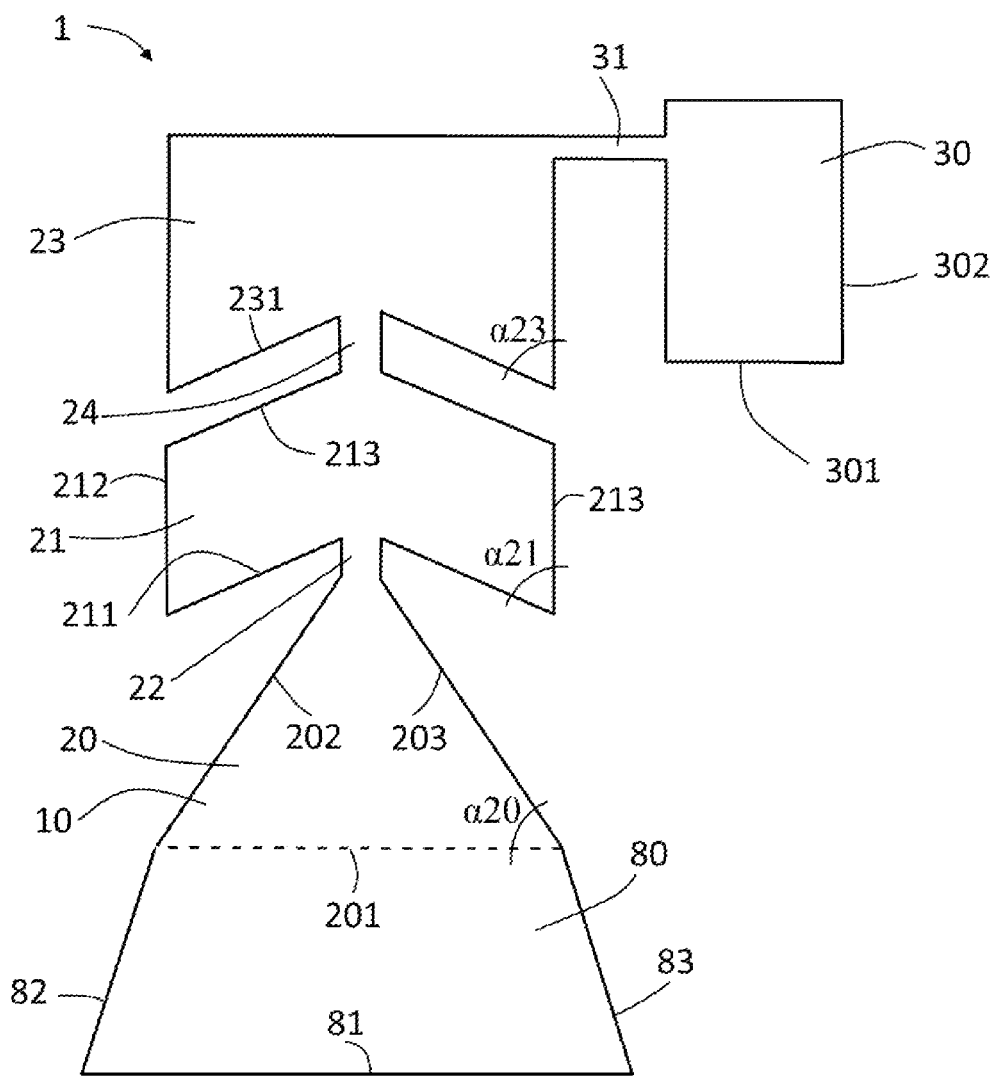
FIG. 11 shows an embodiment of the trapping device of FIG. 1.

In an alternative embodiment shown in FIG. 11, the trapping device 1 comprises a strip 80 that acts as an extension of the base funnel 20. The strip 80 comprises sides 82, 83 that extend from the sides 202, 203 of the base funnel 20, and a bottom edge 81. The strip 80 may be an extension of the same material as the rest of the trapping device 1, or can be a different material. For example, the strip 80 may be a flexible or pliable material (e.g., fabric) that can be used to guide insects (e.g., bed bugs) onto the trapping device. When the trapping device 1 is set up, it can be placed so that the bottom edge 81 of the strip 80 is in contact with a surface, such as the floor, a base board, or a bed frame, and allows for insects to crawl up the strip onto the trapping device 1. If a trapping device 101 with a case 70 is used, the strip 80 can extend outside of the case 70 through an entrance opening (e.g., the bottom entrance opening 741).

In one exemplary embodiment, the trapping device 111 comprises a case 70' for housing the surface 10, as shown in FIGS. 27A-27J. In some aspects that trapping device 111 is similar to the trapping device 101, and similar parts are denoted here with similar reference numerals. The case 70' of the trapping device 111 can include a hinge 730 that enables opening and closing of the case 70'. In the Figures, the trapping device 111 is shown in an open or a partially open (FIGS. 27H and 27J) position. The case 70' includes a front wall 71, a back wall 72, side walls 73', 76', a bottom 74', and a top 75', where the walls 71, 72, 73', 76' and the bottom 74' and top 75' define an interior space 800 when the case 70' is in a closed position. The surface 10 is housed in the interior space 800, where the surface 10 is positioned, for example on the inside of the front or back wall 71, 72. The case 70' includes an opening 741 (see, e.g., FIG. 27G) that may be located at the bottom 74' of the case 70' and be aligned with a bottom edge of the base funnel 20. The opening 741 enables bed bugs to enter the interior space 800 and the surface 10.

The case 70' may further comprise a catching area 742 that may be formed by a first portion 743 of the bottom 74'. The catching area 742 may be constructed of a material (e.g., plastic, metal, paperboard, or cardboard) of a light color (e.g., while, off-white, light gray, or any other suitably light color), and may comprise an insect immobilization adhesive. The catching area 742 may be part of a continuous wall that is defined by the side wall 73', and the first portion 743 and the second portion 744 of the bottom 74'. The bottom 74' may further comprise a third portion 745 and a fourth portion 756, where the third portion 745 and the fourth portion 756 form a continuous wall. The continuous walls formed by the first, second, third, and fourth portions 743, 744, 745, 745 may include upwardly extending sections (formed, e.g., by the second and fourth portions 744, 746) that surround the base funnel 20 on each side. The upwardly extending sections can help guide bed bugs into the trapping device 111 and prevent bed bugs from escaping the trapping device 111.

The trapping device 111 may optionally include a mechanism that enables attaching the trapping device 111 to a fixture (e.g., a piece of furniture or a wall). In the exemplary embodiment shown in FIG. 27A-28E, the trapping device 111 comprises an attachment mechanism 750 that can be removably coupled with a corresponding fixed mounting device 780 (see FIGS. 28A-28E) attached to a fixture. The attachment mechanism 750 may be of any suitable type and is not limited to the embodiment shown. The attachment mechanism 750 may, for example, include prongs 751, 752 that can be inserted into corresponding openings 784, 783 of the fixed mounting device 780. One or more of the prongs 751, 752, such as the center prong 752, may include a catch mechanism 753 and a release mechanism 754. The catch mechanism 753 may comprise, for example, a lip (see FIG. 27J) that catches a corresponding lip, edge, or opening 781 in the fixed mounting device 780. The center prong 752 may further include a biasing mechanism (e.g., a spring) that biases the catch mechanism 753 against the corresponding lip or edge 781. The attachment mechanism 750 may be removed from the fixed mounting device 780 by pushing on the release mechanism 754 that acts on the biasing mechanism to release the catch mechanism 753. The prongs 751 may be used to align the front and back walls 71', 72' of the trapping device 111 and to keep the trapping device 111 in a closed position while it is attached to the fixed mounting device 780.

The fixed mounting device 780 can be mounted by a mounting means that can be used to mount the fixed mounting device 780 on a surface such as a wall or the surface of a piece of furniture, such as a bed, a book case, or a dresser. The mounting means may comprise, for example, hardware such as screws, bolts, nails, clips, etc., or adhesive pads such as epoxy or urethane adhesives, or hook-and-loop type fasteners. In the exemplary embodiment shown, the fixed mounting device 780 includes holes 782 to enable mounting by screws or nails.

The case 70' may be constructed of any suitable material, such as plastic, glass, metal, paperboard, cardboard, or a combination thereof. The case 70' may, for example, be constructed of polyacrylic (e.g., polymethyl methacrylate), polyethylene, polypropyl, polycarbonate, or any other suitable plastic. According to some embodiments, some or most parts of the case 70' are opaque. In some preferred embodiments, some or more parts of the case 70' have a dark color. The catching area 742 may have a light color, such as white, off-white, light gray, etc.

The trapping device 101, 111 can be attached to any suitable surface (e.g., by the fixed mounting device 780) where the trapping device 101, 111 may need to bed used. For example, the trapping device 111 can be attached to a piece of furniture, such as a headboard, a bed frame, book case, dresser, sofa, chair, table, etc., or to a wall or post. In some embodiments, the trapping device 101, 111 can be removably attached so that the trapping device 101, 111 can be checked for and emptied of bed bugs, and optionally re-attached.

According to embodiments, the trapping device 1, 101, 111 can be configured as a passive trapping device or an active trapping device. If the trapping device 1, 101, 111 is configured as an active trapping device, the trapping device 1, 101, 111 may comprise an insect attractant. Suitable attractants for bed bugs are, for example, heat, carbon dioxide, pheromones, and host odors (e.g., human kairomones). For example, synthetic pheromones or natural pheromones (e.g., aggregation or arrestment pheromones) secreted by the bed bugs can be used to attract bed bugs to the trap.

EXAMPLES

A number of trapping devices with various configurations were constructed and tested. Each trapping device was placed in a plastic tub (the "testing area"). A number of bed bugs were placed in the testing area, and the number of bugs found on the trapping device were counted at the end of each test period. The length of the test period varied from 1-8 days.

Example 1

A trapping device with a dish-shaped catching area was constructed of black poster board (foam board sandwiched between paper). A strip of non-stick PTFE material (FLUON®, available from AGC Chemicals Americas, Inc., in Exton, Pa.) was applied around the edges of the wing section. A picture of the trap is shown in FIG. 12. The trap was placed in the testing area with 150 bugs for 1 day, 150 bugs for 3 days, and 100 bugs for 3 days. The results are shown in Table 1.

TABLE 1

| Number Of Bugs In Testing Area | Number Of Days | Bugs Caught | Bugs Caught,% |
|---|---|---|---|
| 150 | 1 | 84 | 56% |
| 150 | 3 | 58 | 38% |
| 100 | 3 | 64 | 64% |

Example 2

A trapping device with a horizontal catching area was constructed of black poster board (foam board sandwiched between paper). A strip of non-stick PTFE material (FLUON®, available from AGC Chemicals Americas, Inc., in Exton, Pa.) was applied around the edges of the wing section and to form an additional wing section. A picture of the trap is shown in FIGS. 13A and 13B. The trap was placed in the testing area with 100 bugs for 1 day, and 100 bugs for 2 days. Half of the bugs were hungry and half had been fed prior to the test. In the 1-day test the trap was sprayed with an insecticide (Temprid), and for counting purposes bugs were considered caught if they were killed. The results are shown in Table 2.

TABLE 2

| Number Of Bugs In Testing Area | Number Of Days | Bugs Caught | Bugs Caught,% |
|---|---|---|---|
| 100 | 1 | 55 | 55% |
| 100 | 2 | 21 | 21% |

Example 3

Figure 14B:
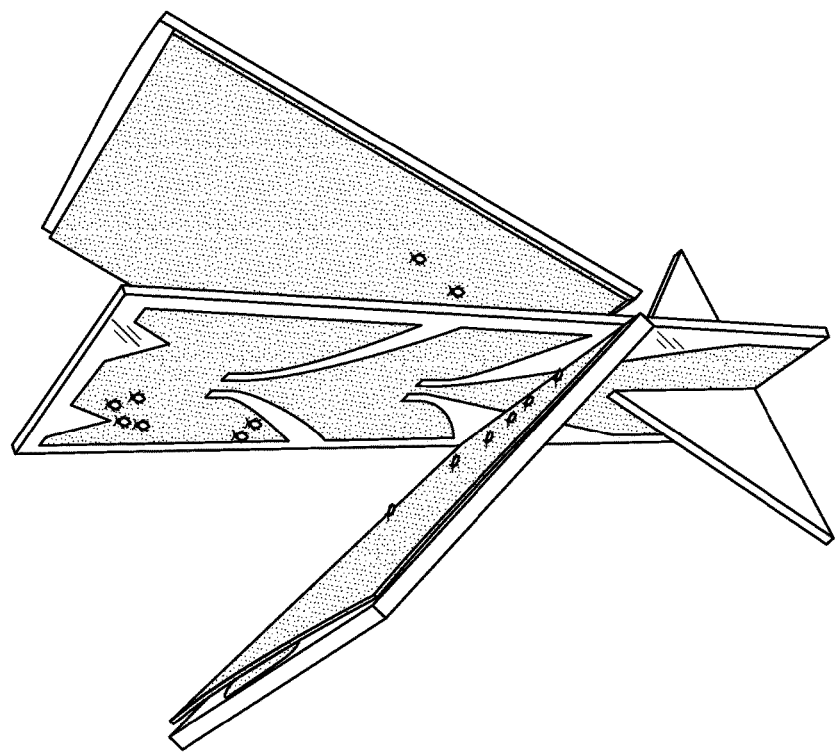
Figure 14A:
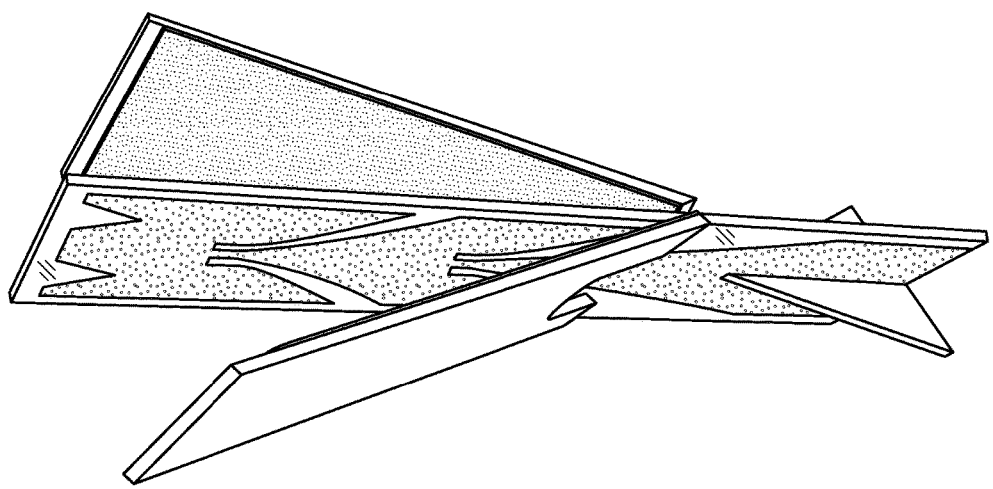

A trapping device with additional, diagonally placed wing sections was constructed. The trap was tested using yellow paper as the trap surface and smooth acrylic plastic as the background material. The trap was also tested by covering the trap surface with white printer paper. Pictures of the traps are shown in FIGS. 14A and 14B. The yellow trap was placed in the testing area with 100 bugs for 2 days, and the white trap with 100 bugs for 1 day. The results are shown in Table 3.

TABLE 3

| Trap | Number Of Bugs In Testing Area | Number Of Days | Bugs Caught | Bugs Caught,% |
| --- | --- | --- | --- | --- |
| Yellow | 100 | 2 | 7 | 7% |
| White | 100 | 1 | 26 | 26% |

Example 4

Figure 15:
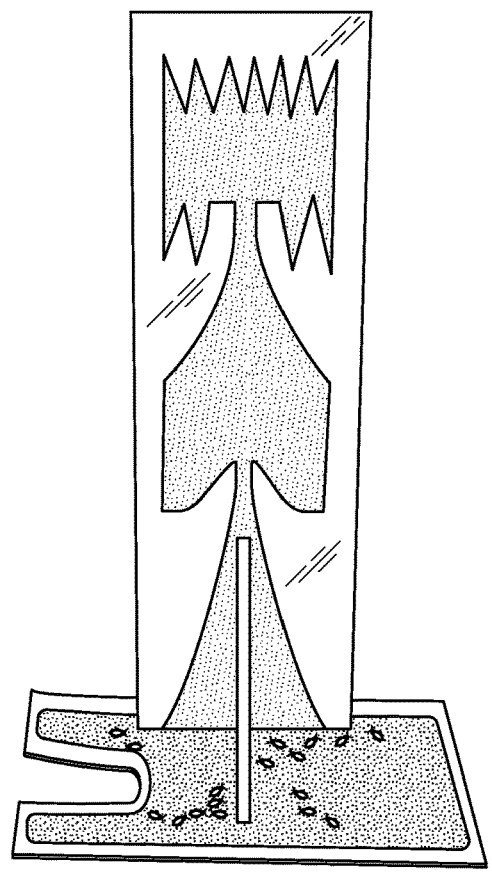

A trap with a "spiky" top section was constructed from white paper. A picture of the trap is shown in FIG. 15. The trap was placed in the testing area with 100 bugs for 1 day. The results are shown in Table 4.

TABLE 4

| Number Of Bugs In Testing Area | Number Of Days | Bugs Caught | Bugs Caught,% |
| --- | --- | --- | --- |
| 100 | 1 | 25 | 25% |

Example 5

Figure 16A:
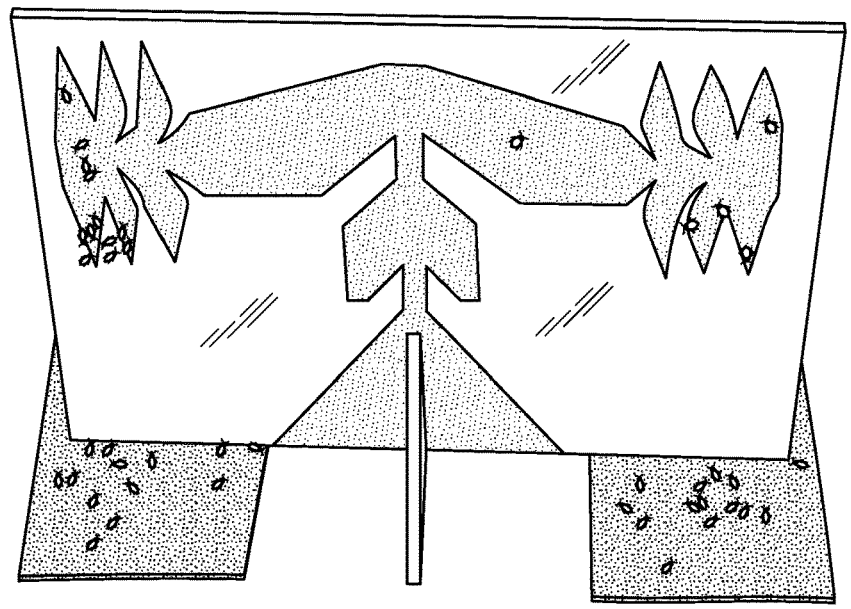
Figure 16B:
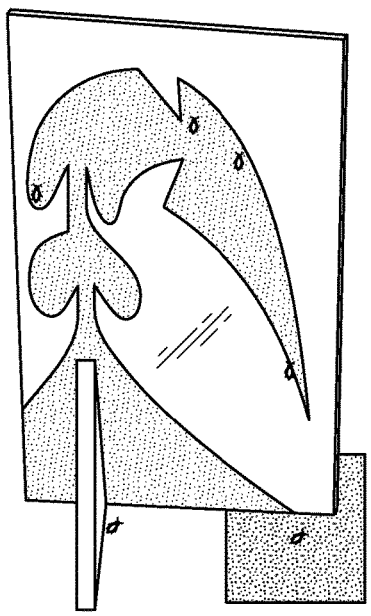

Traps with multiple collecting areas with pointy extensions was constructed from white paper. A picture of trap A is shown in FIG. 16A and trap B in FIG. 16B. The trap was placed in the testing area with 100 bugs for varying number of days. A bed bug attractant ($CO_2$) was used in three of the tests. The results are shown in Table 5.

TABLE 5

| Trap | $CO_2$ | Number Of Bugs In Testing Area | Number Of Days | Bugs Caught | Bugs Caught,% |
| --- | --- | --- | --- | --- | --- |
| A | No | 100 | 8 | 43 | 43% |
| A | Yes | 100 | 3 | 42 | 42% |
| A | Yes ($2^{nd}$ and $3^{rd}$ nights) | 100 | 3 | 52 | 52% |
| A | Yes | 100 | 1 | 44 | 44% |
| B | No | 100 | 8 | 5 | 5% |
| B | Yes | 100 | 3 | 24 | 24% |

Example 6

Figure 17:
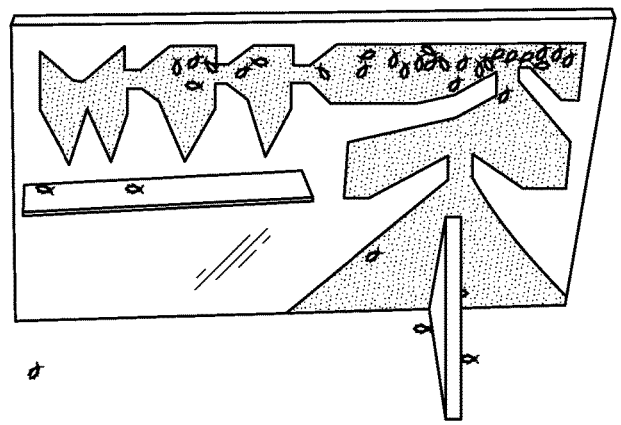

A trap with multiple collecting areas with pointy extensions was constructed from white paper. A catching area was added underneath the collecting areas. A picture of the trap is shown in FIG. 17. The trap was placed in the testing area with 100 bugs for three days. A bed bug attractant (heat and $CO_2$) was used. The results are shown in Table 6.

TABLE 6

| Number Of Bugs In Testing Area | Number Of Days | Bugs Caught | Bugs Caught,% |
| --- | --- | --- | --- |
| 100 | 3 | 44 | 44% |

Example 7

Figure 18:
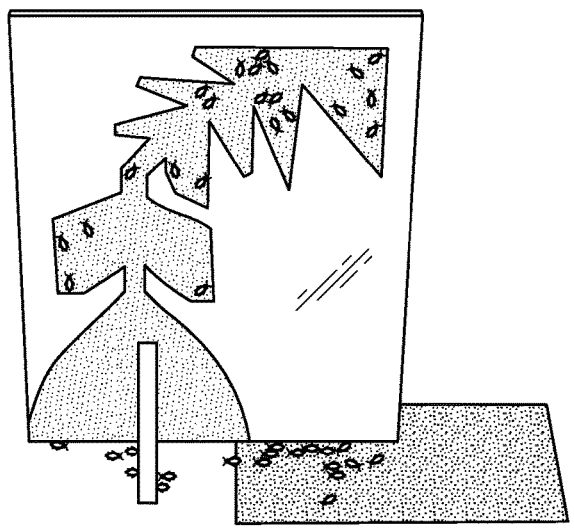

A trap with multiple collecting areas with pointy extensions was constructed from white paper. A picture of the trap is shown in FIG. 18. The trap was placed in the testing area with 100 bugs for one and three days. The results are shown in Table 7.

TABLE 7

| Number Of Bugs In Testing Area | Number Of Days | Bugs Caught | Bugs Caught,% |
| --- | --- | --- | --- |
| 100 | 1 | 8 | 8% |
| 100 | 3 | 22 | 22% |

Example 8

Figure 19:
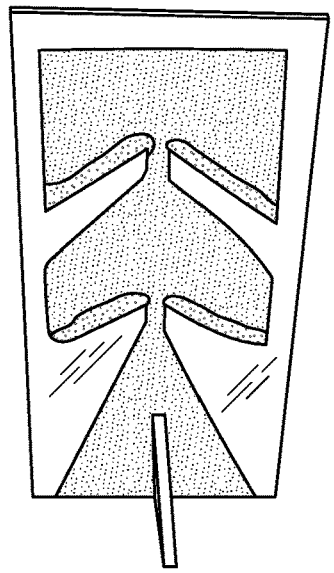

A trap with two wing sections and a strip of adhesive at the bottom of each wing section was constructed from white paper. A picture of the trap is shown in FIG. 19. The trap was placed in the testing area with 100 bugs for one day. The results are shown in Table 8. It was observed that when the bugs came into contact with the glue they turned around, avoiding entering the area with the glue.

TABLE 8

| Number Of Bugs In Testing Area | Number Of Days | Bugs Caught | Bugs Caught,% |
| --- | --- | --- | --- |
| 100 | 1 | 20 | 20% |

Example 9

Figure 20:
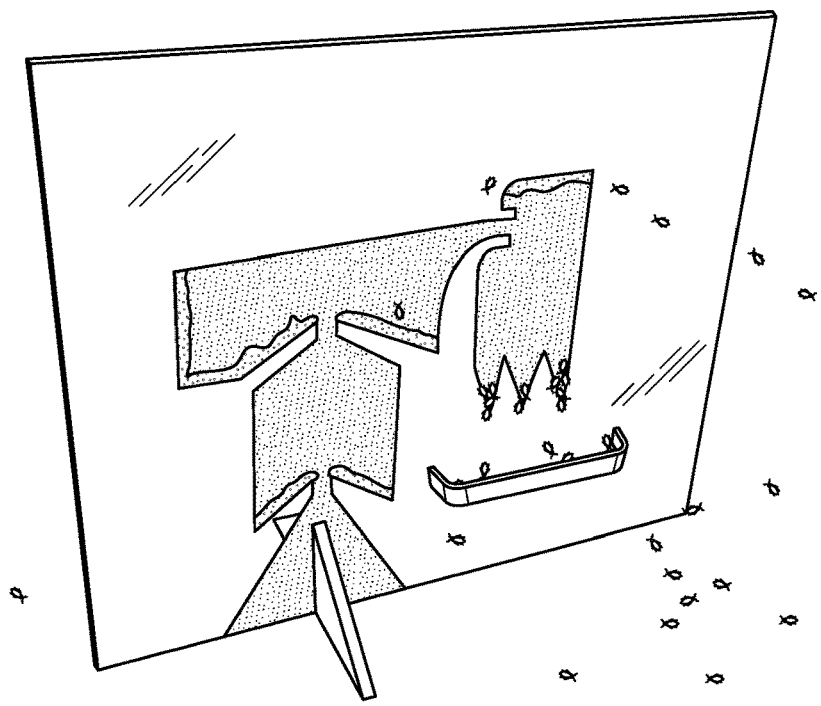

A trap with two wing sections, a collecting area with downward pointed extensions, and a trough-shaped catching area was constructed. A picture of the trap is shown in FIG. 20. The surface of the trap was constructed of white paper with strips of glue at the bottom of the wing sections and at the top of the collecting area. A transparent plastic was used as a support backing. The trap was placed in the testing area with 100 or 88 bugs for one day. The results are shown in Table 9.

TABLE 9

| Number Of Bugs In Testing Area | Number Of Days | Bugs Caught | Bugs Caught,% |
| --- | --- | --- | --- |
| 100 | 1 | 68 | 68% |
| 88 | 1 | 44 | 50% |

Example 10

Figure 21A:
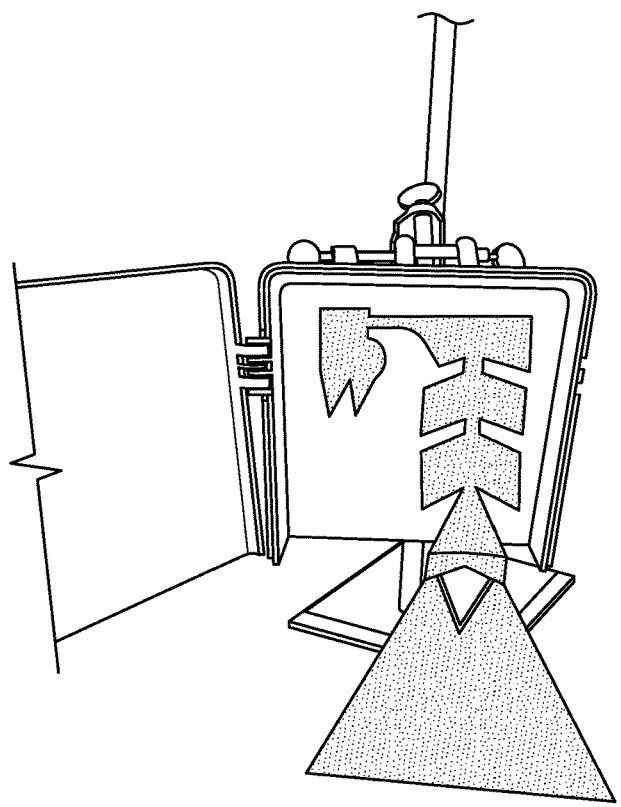
Figure 21B:
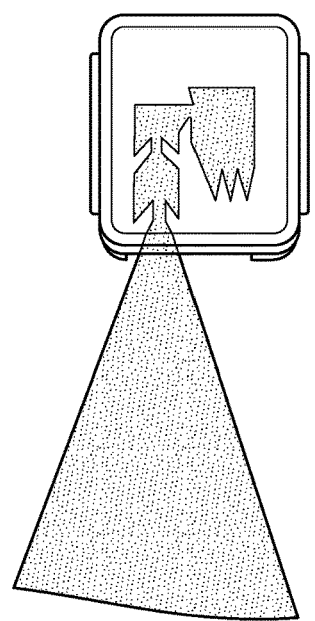
Figure 21C:
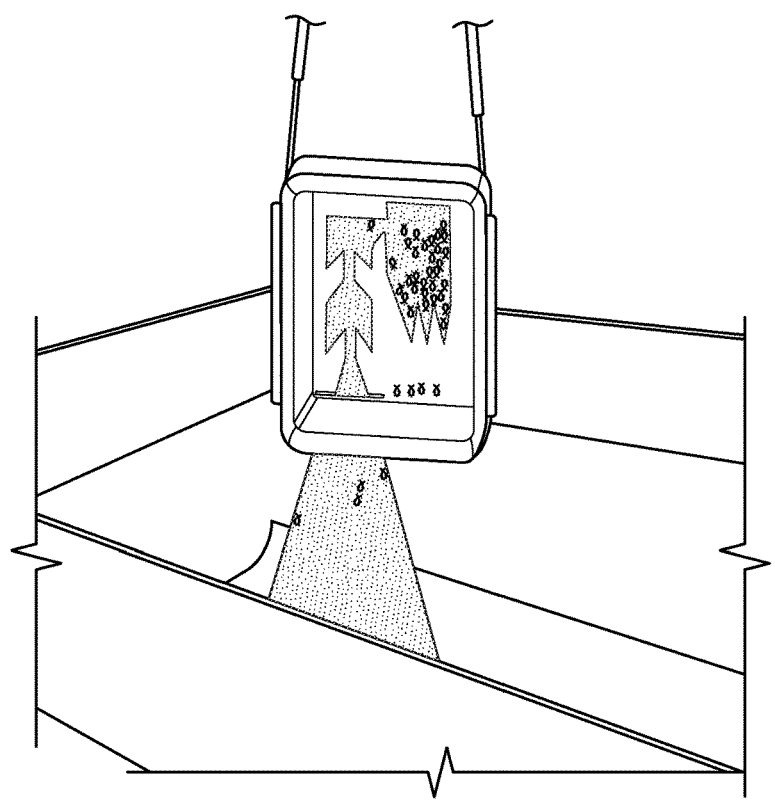
Figure 21D:
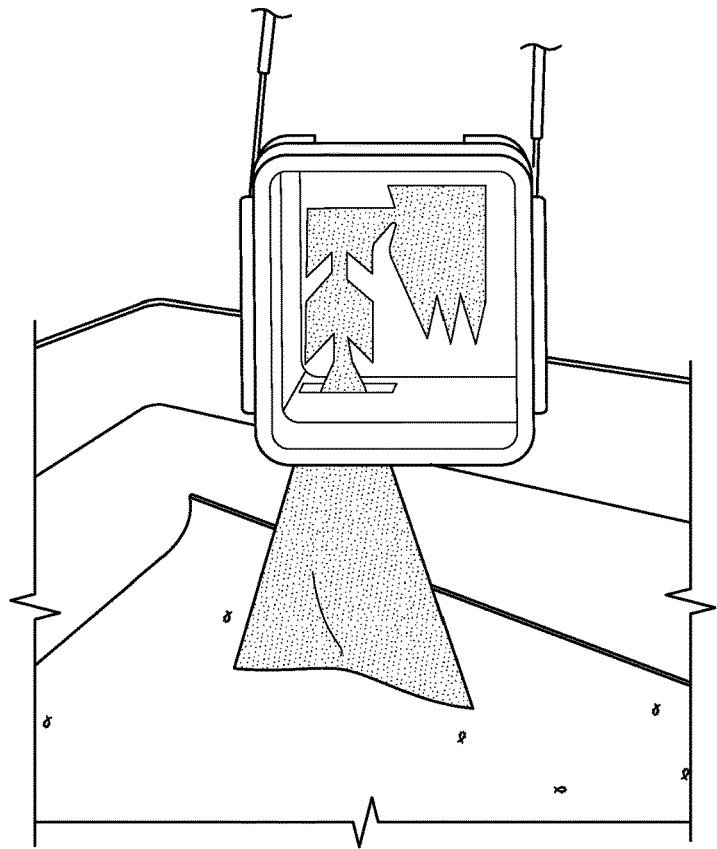
Figure 21E:
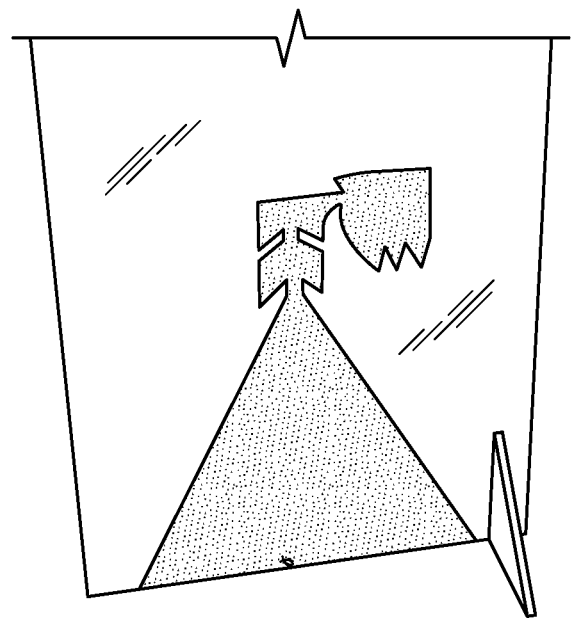

Traps with multiple wing sections, a collecting area with downward pointed extensions, and an elongated "tail" were constructed from various materials. A picture of trap A is shown in FIG. 21A, trap B in FIG. 21B, trap C in FIG. 21C, trap D in FIG. 21D, and trap E in FIG. 21E. Traps A-D included a plastic case, whereas trap E had an acrylic support backing. Trap A had a larger size than traps B-E. The traps were placed in the testing area with 100 or 88 bugs for a varying number of days. The results are shown in Table 10.

TABLE 10

| Trap | Material | Number Of Bugs In Testing Area | Number Of Days | Bugs Caught | Bugs Caught,% |
| --- | --- | --- | --- | --- | --- |
| A | Paper | 100 | 6 | 46 | 46% |
| B | Cloth | 100 | 1 | 5 | 5% |
| C | Paper | 100 | 1 | 50 | 50% |
| D | Cloth (denim) | 88 | 1 | 34 | 39% |
| E | Cloth | 88 | 1 | 0 | 0% |

Example 11

Figure 22A:
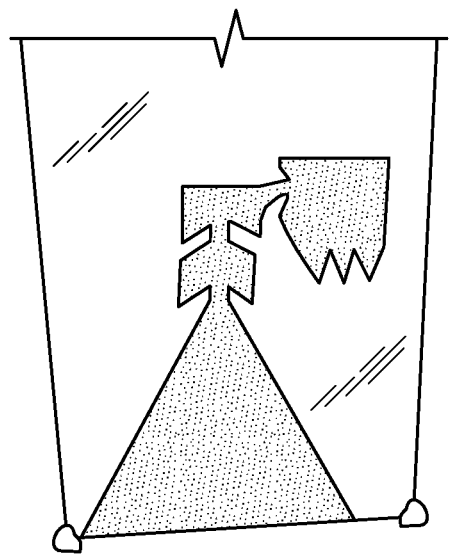
Figure 22C:
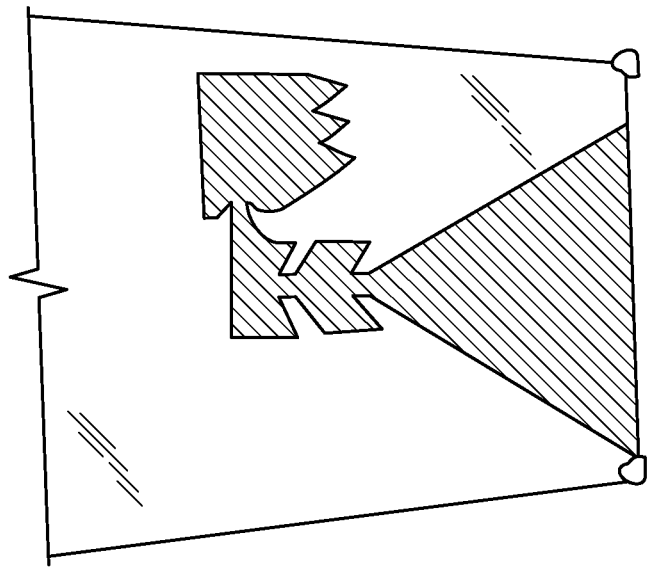
Figure 22B:
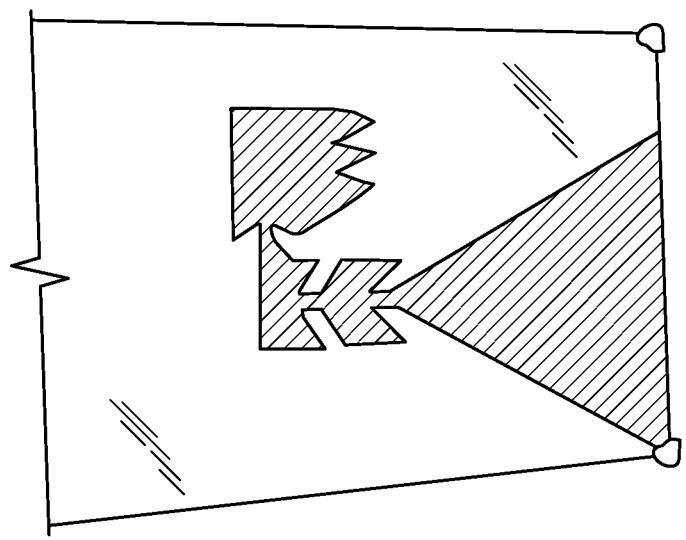
Figure 22J:
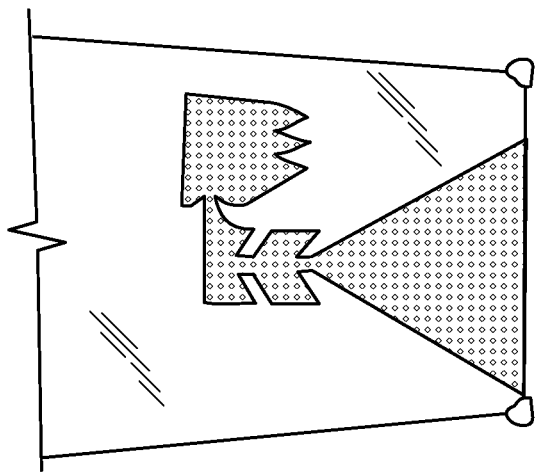
Figure 22H:
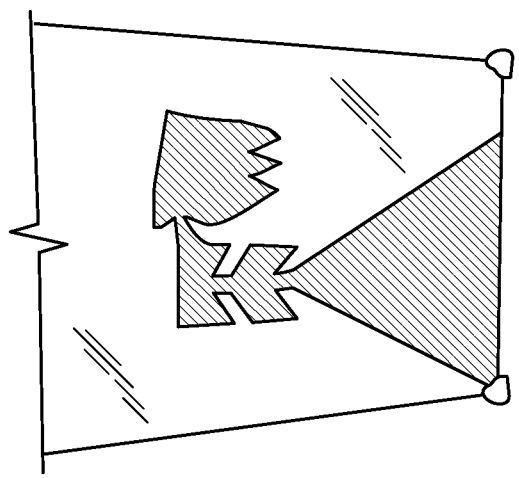
Figure 22G:
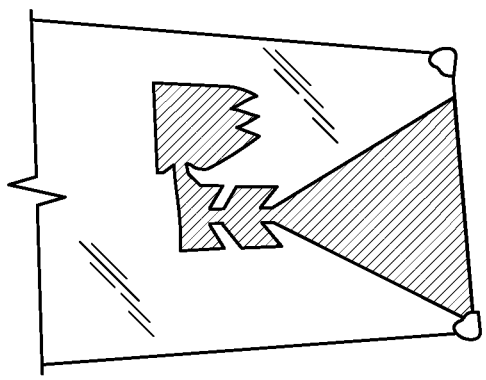
Figure 22M:
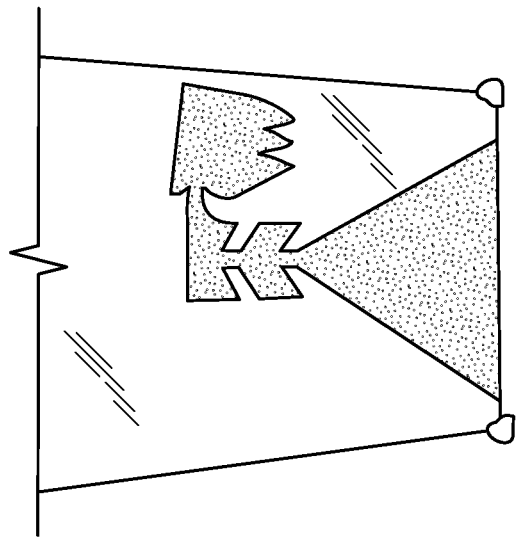
Figure 22L:
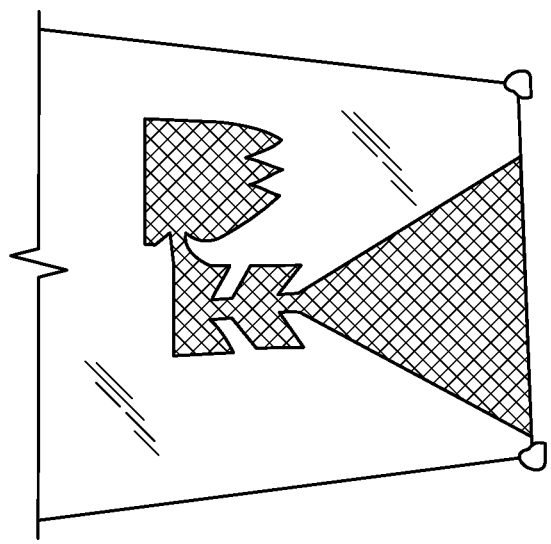
Figure 22K:
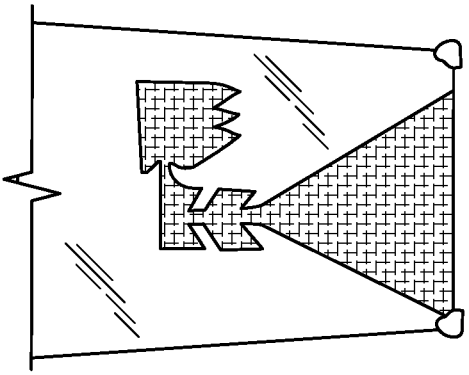
Figure 22N:
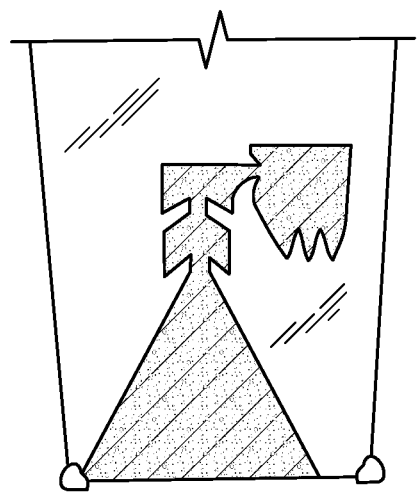

Traps with two wing sections and a collecting area with downward pointed extensions were constructed from various materials. A picture of trap A is shown in FIG. 22A, trap B in FIG. 22B, trap C in FIG. 22C, trap D in FIG. 22D, and trap E in FIG. 22E, trap F in FIG. 22F, trap G in FIG. 22G, trap H in FIG. 22H, and trap J in FIG. 22J, trap K in FIG. 22K, trap L in FIG. 22L, and trap M in FIG. 22M. The average catch of five repeat tests was calculated. The results are shown in Table 11.

TABLE 11

| Trap | Material | Average Bugs Caught | STDEV |
| --- | --- | --- | --- |
| A | Cloth, lab coat | 18% | 8% |
| B | Printer paper | 24% | 11% |
| C | Cloth, denim | 29% | 14% |
| D | Cloth, sheet | 10% | 6% |
| E | Cloth, pillow case | 27% | 13% |
| F | Paper with layer of spray glue | 19% | 8% |
| G | Cloth, sheet | 11% | 3% |
| H | Screen mesh | 7% | 3% |
| J | Construction paper | 18% | 10% |
| K | Paper napkin, brown | 22% | 7% |
| L | Paper napkin, white | 15% | 8% |
| M | Kim Wipe ® | 15% | 7% |
| N | Manilla folder paper | 5% | 6% |

Example 12

Figure 23A:
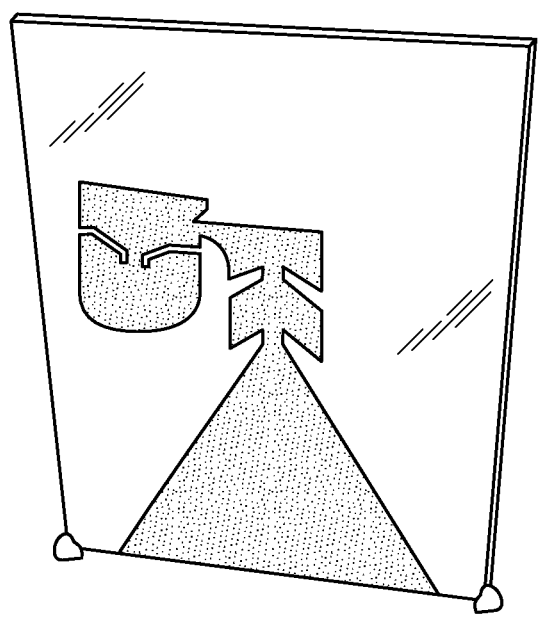
Figure 23B:
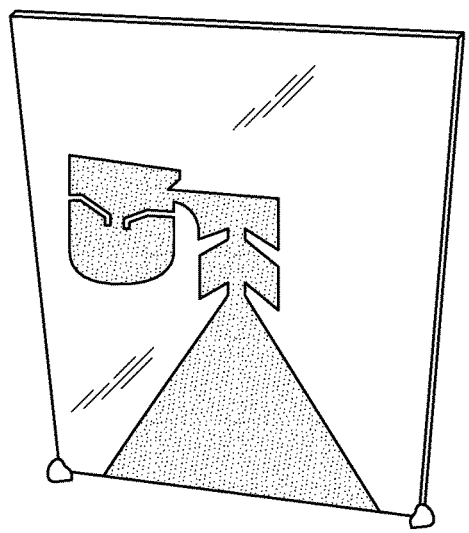
Figure 23C:
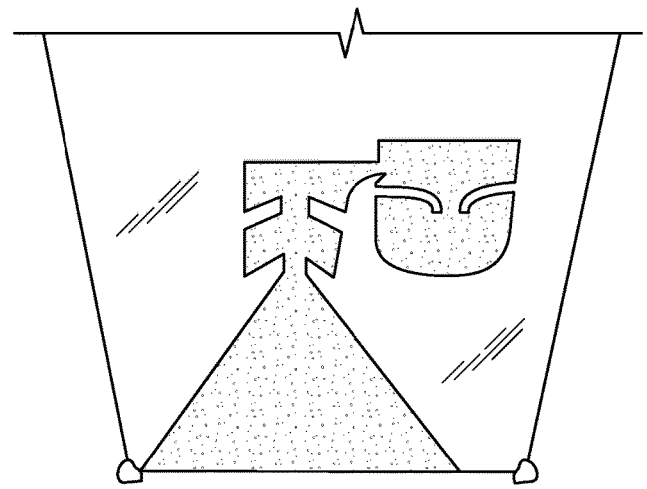
Figure 23D:
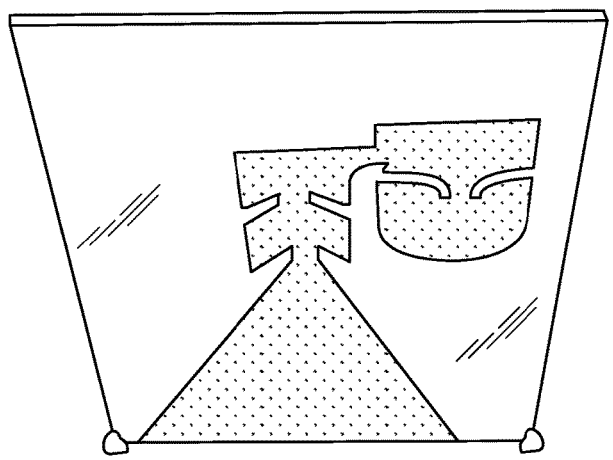

Additional prototypes of traps with multiple wing sections, and a collecting area with a wing section and a rounded bottom were constructed from various materials. Trap A was constructed of white cloth; trap B of white 100% cotton muslin cloth; trap C of black cloth; and trap D of brown cloth. A picture of trap A is shown in FIG. 23A, trap B in FIG. 23B, trap C in FIG. 23C, and trap D in FIG. 23D.

Example 13

Figure 24A:
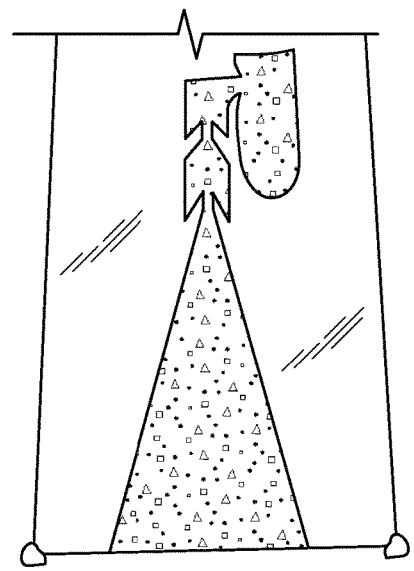
Figure 24B:
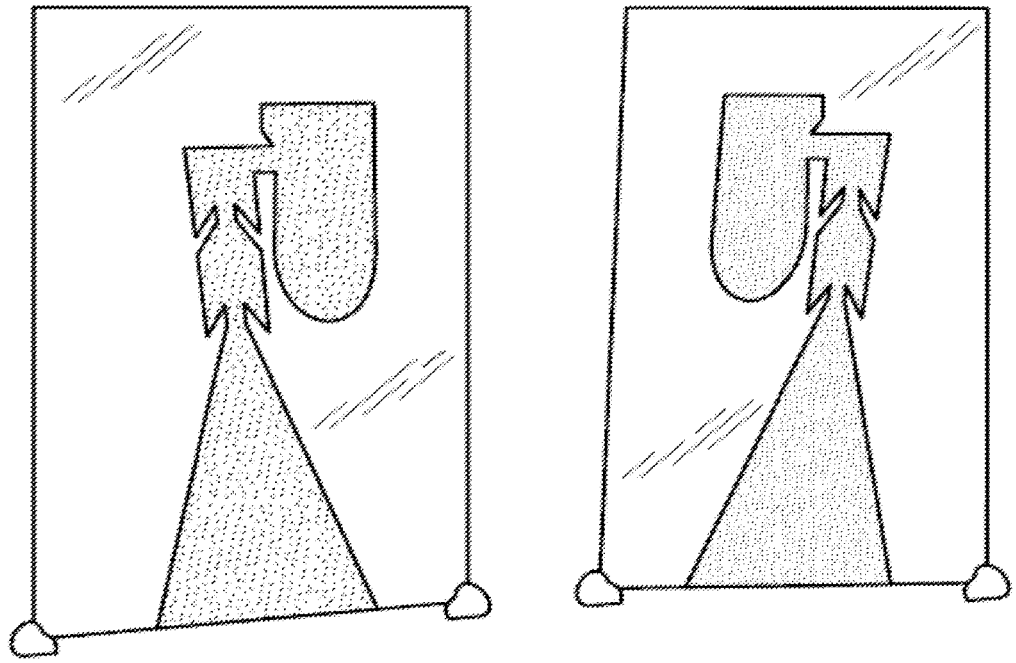
Figure 24C:
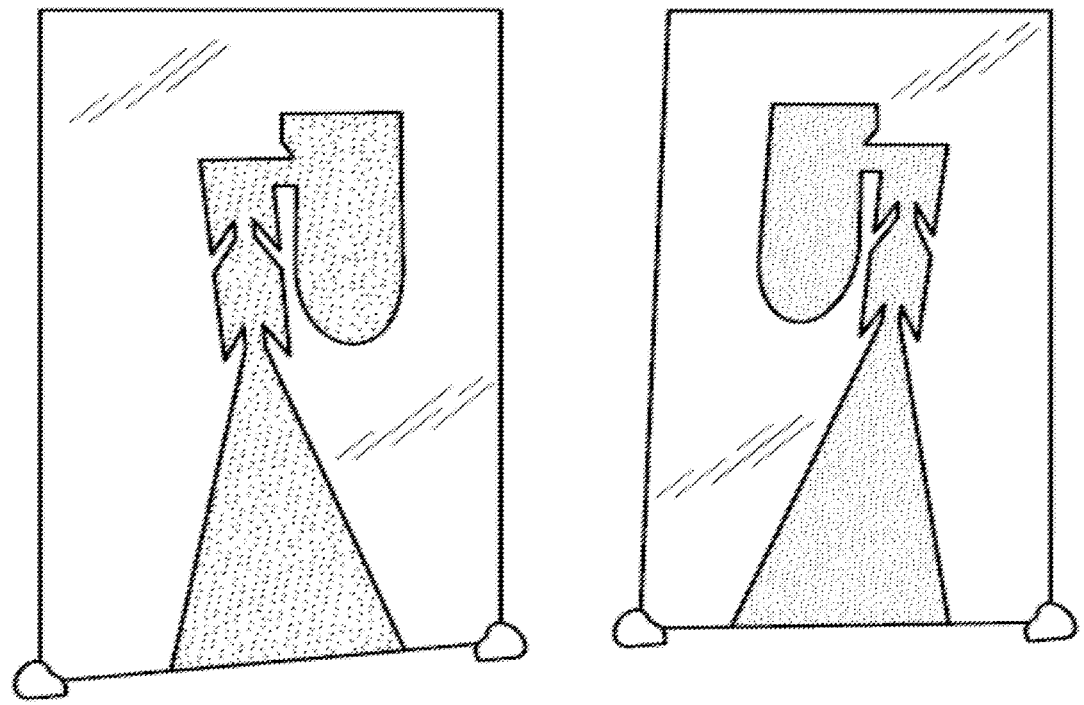

Additional prototypes of traps with multiple wing sections, and a collecting area with a rounded bottom were constructed from various materials. Trap A was constructed of cloth; traps B and C of 3D-printed plastic. Traps B and C had slightly different textures. A picture of trap A is shown in FIG. 24A, trap B in FIG. 24B, and trap C in FIG. 24C.

Example 14

Figure 25:
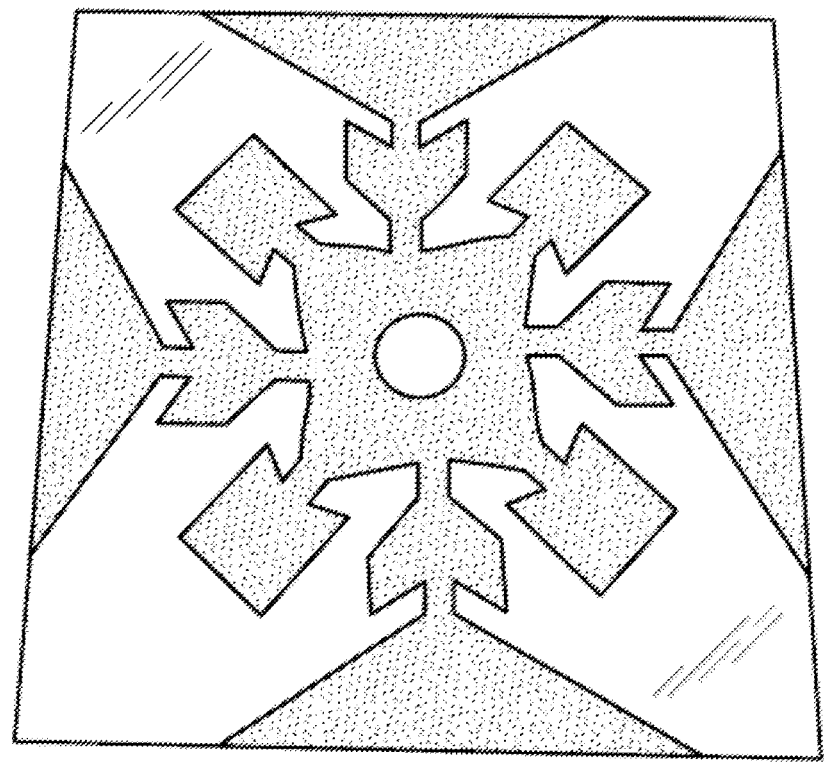

A trap with multiple entrances and wing sections was constructed of white paper. A picture of the trap is shown in FIG. 25. A transparent plastic was used as a support backing.

Example 15

Figure 26A:
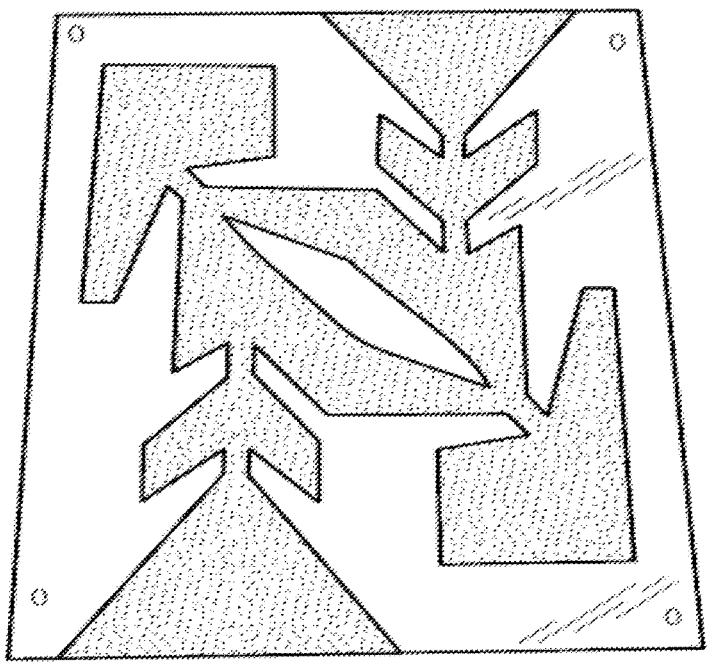
Figure 26B:
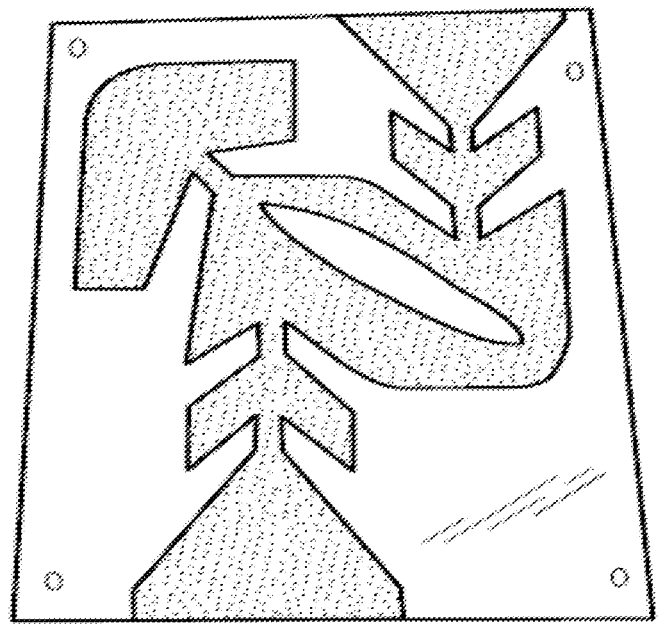
Figure 26C:
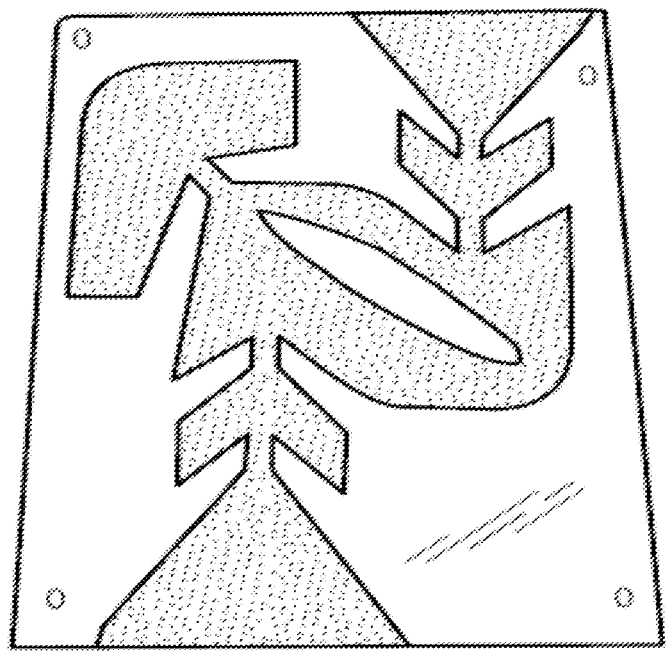
Figure 26D:
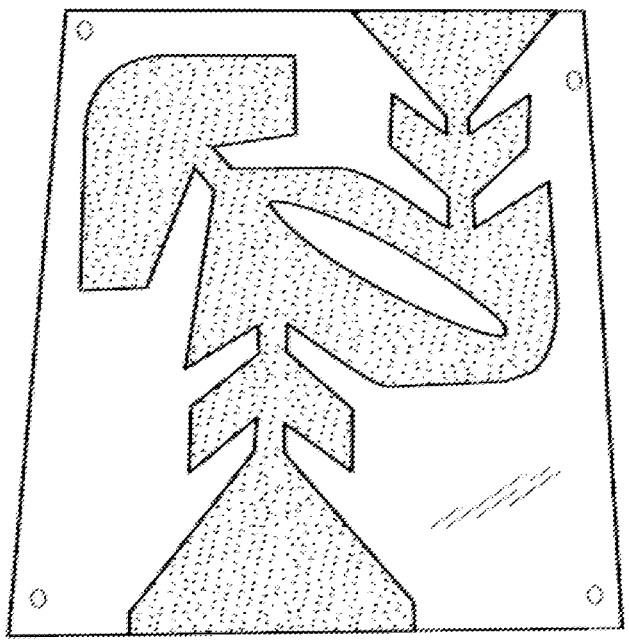
Figure 26E:
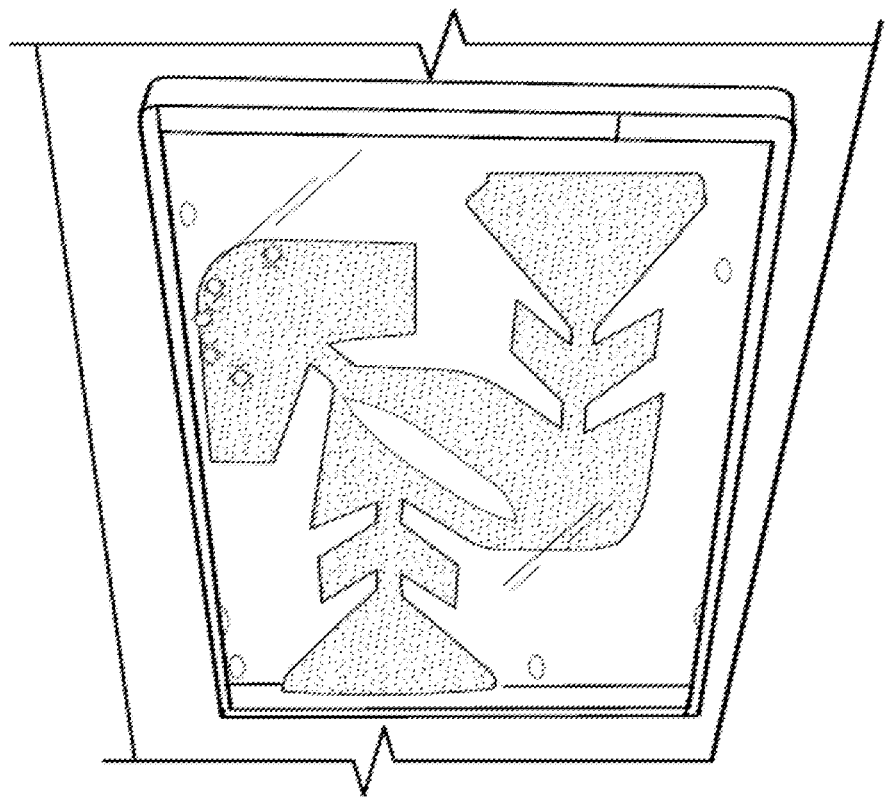
Figure 27A:
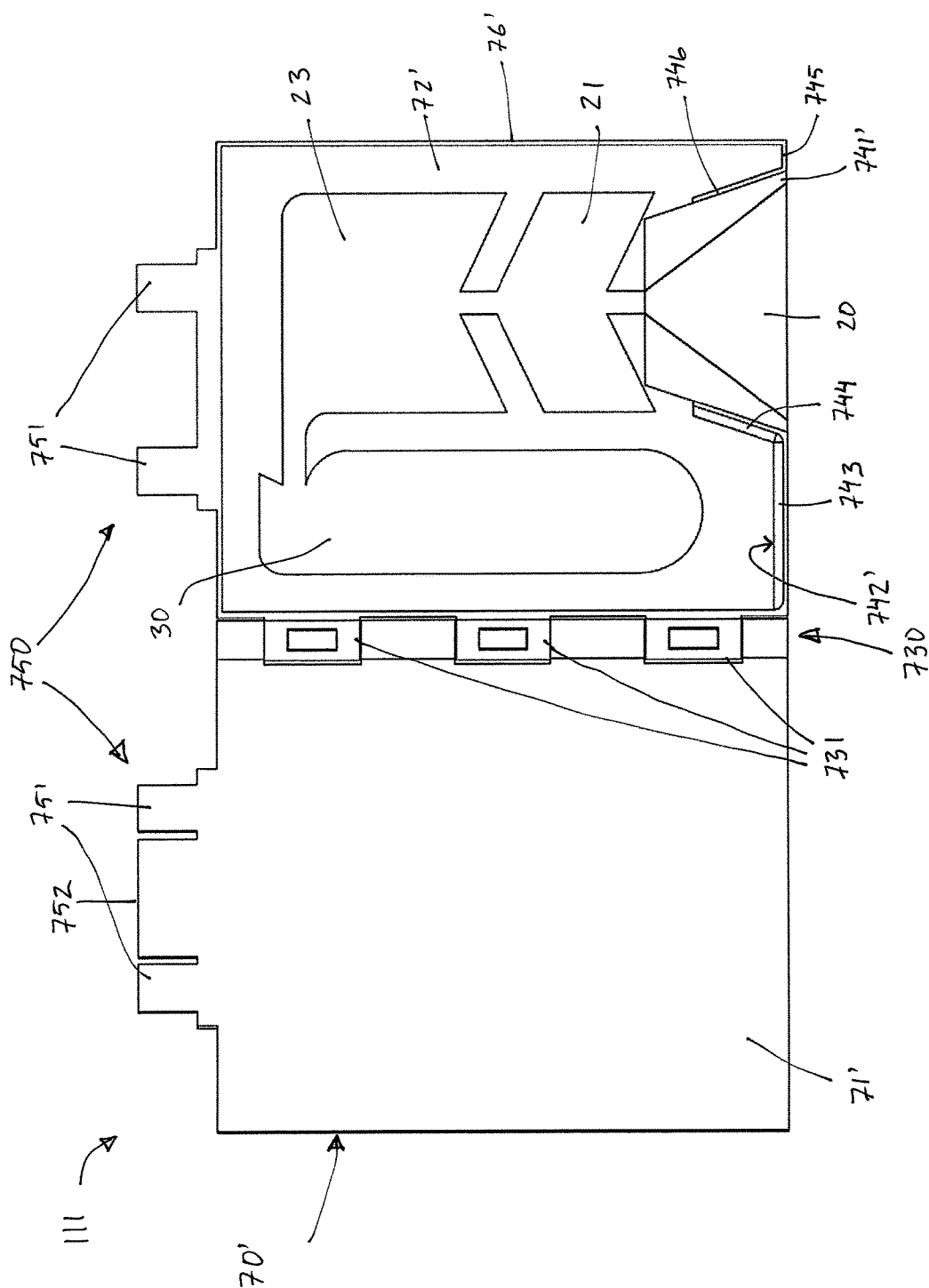
FIG. 27A is a front view of a trapping device in an open position according to an embodiment.
Figure 27B:
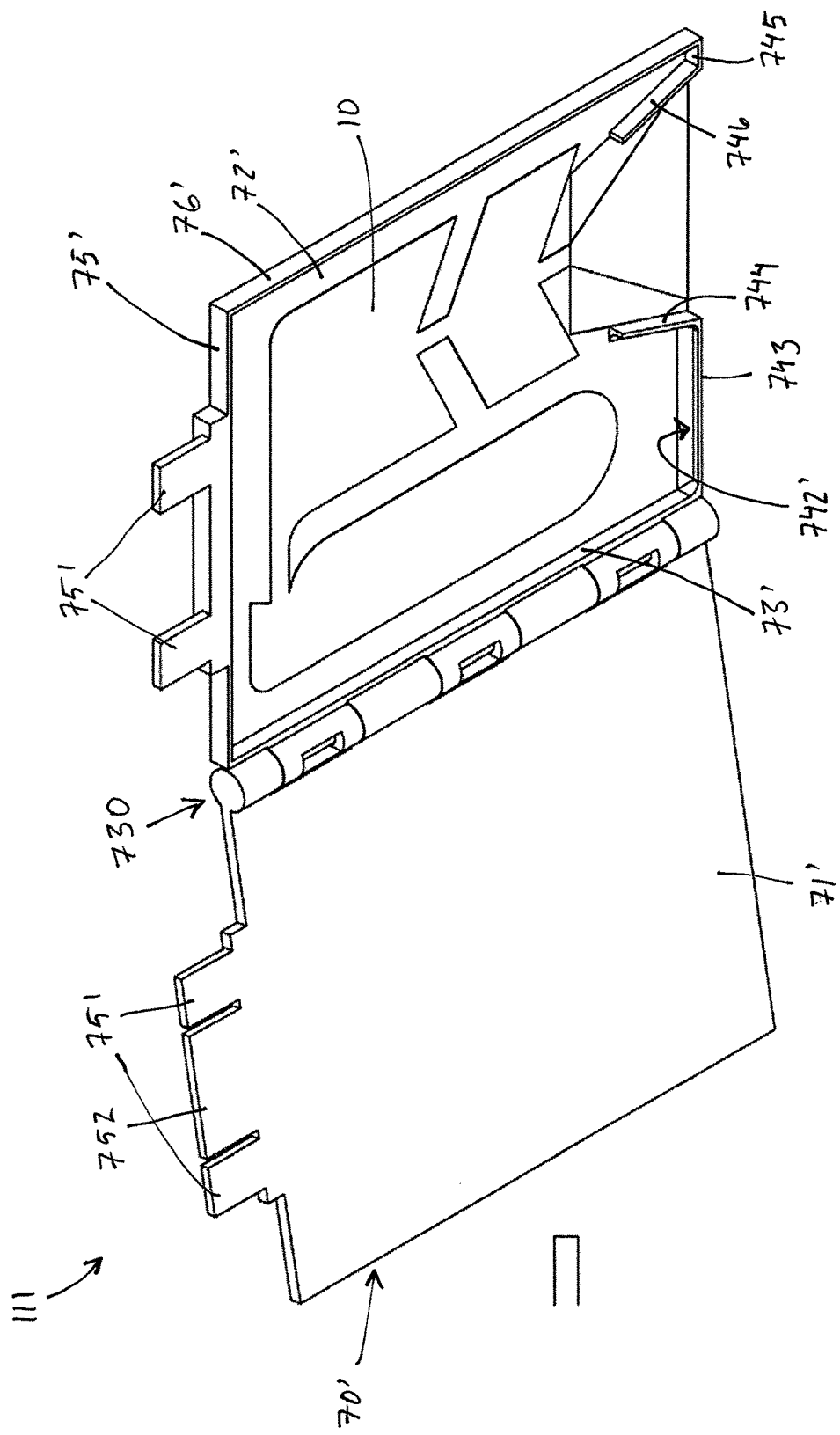
FIG. 27B is a top perspective view of the trapping device of FIG. 27A.
Figure 27C:
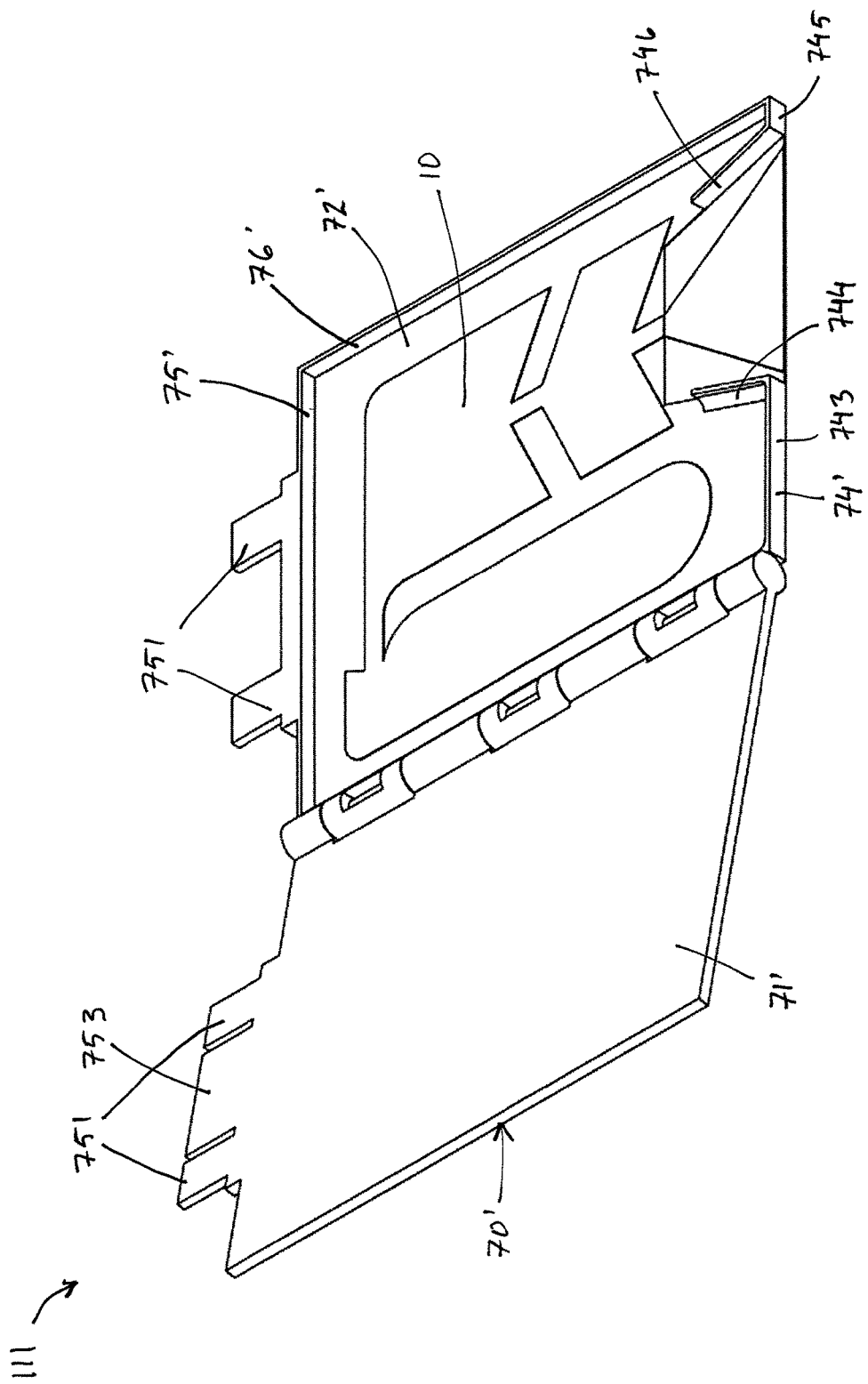
FIG. 27C is a bottom perspective view of the trapping device of FIG. 27A.
Figure 27E:
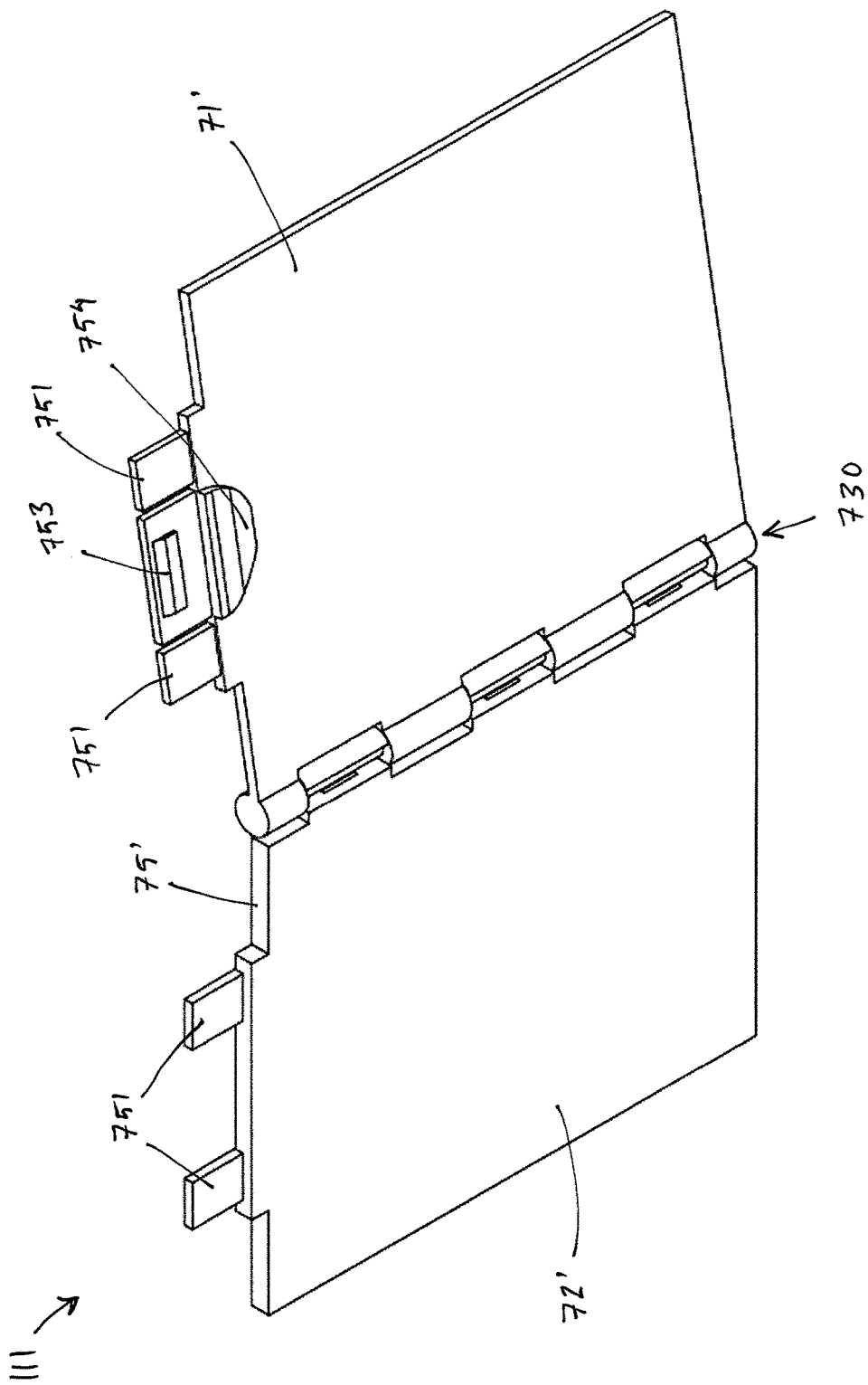
FIG. 27E is a back perspective view of the trapping device of FIG. 27A.
Figure 27F:
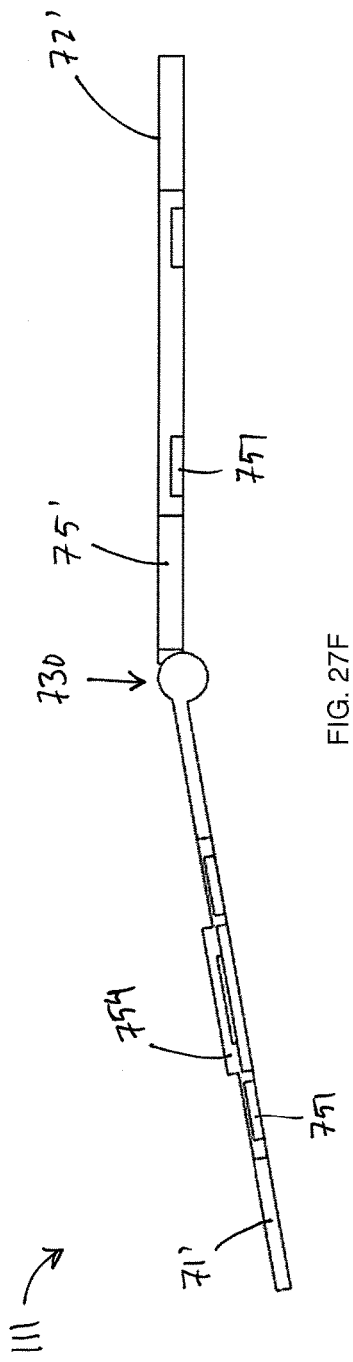
FIG. 27F is a top view of the trapping device of FIG. 27A.
Figure 27G:
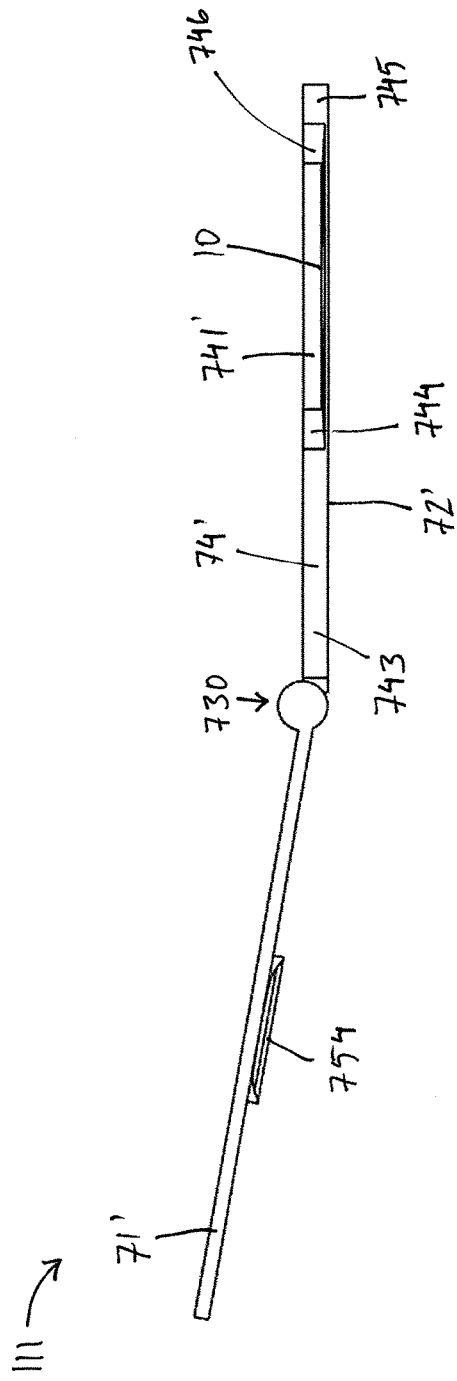
FIG. 27G is a bottom view of the trapping device of FIG. 27A.
Figure 27H:
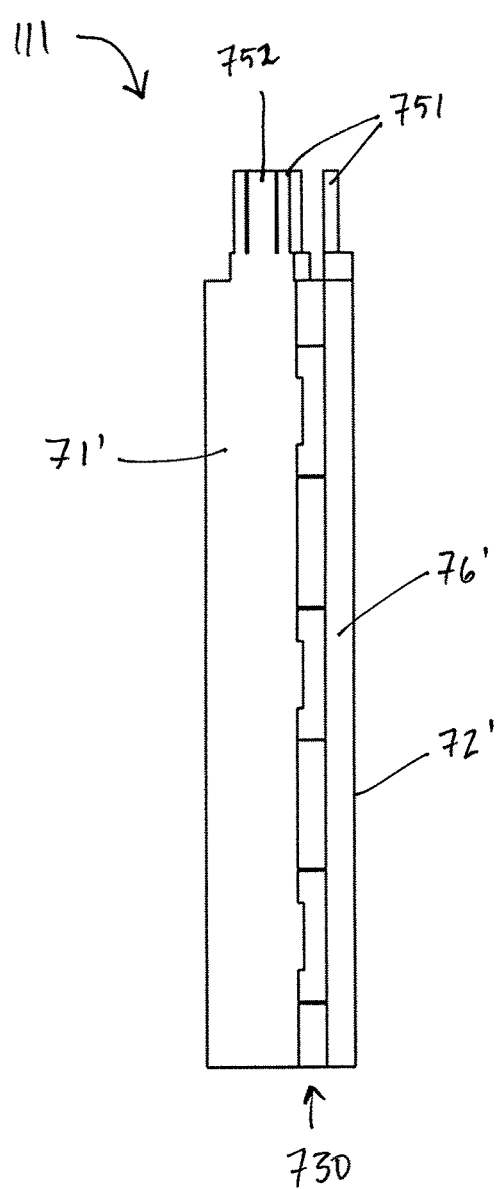
FIGS. 27H and 27J are side views of the trapping device of FIG. 27A.
Figure 27J:
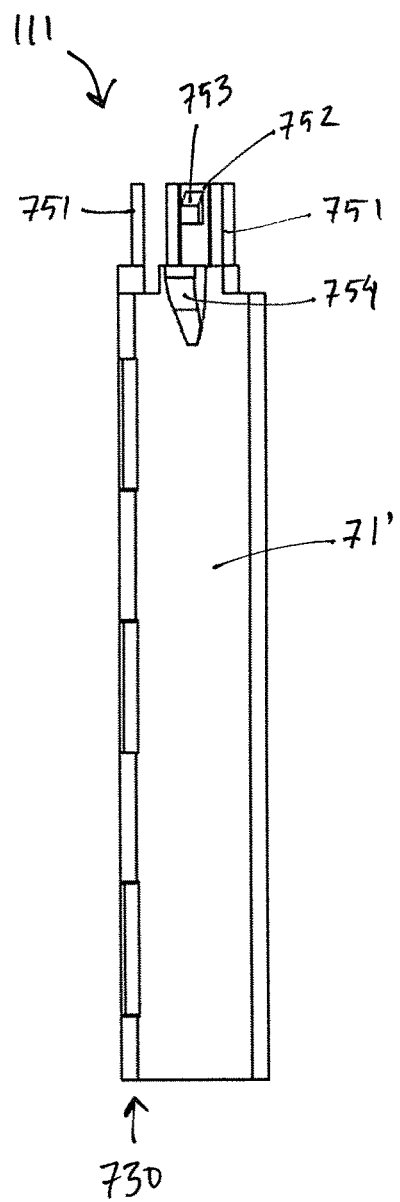
Figure 28A:
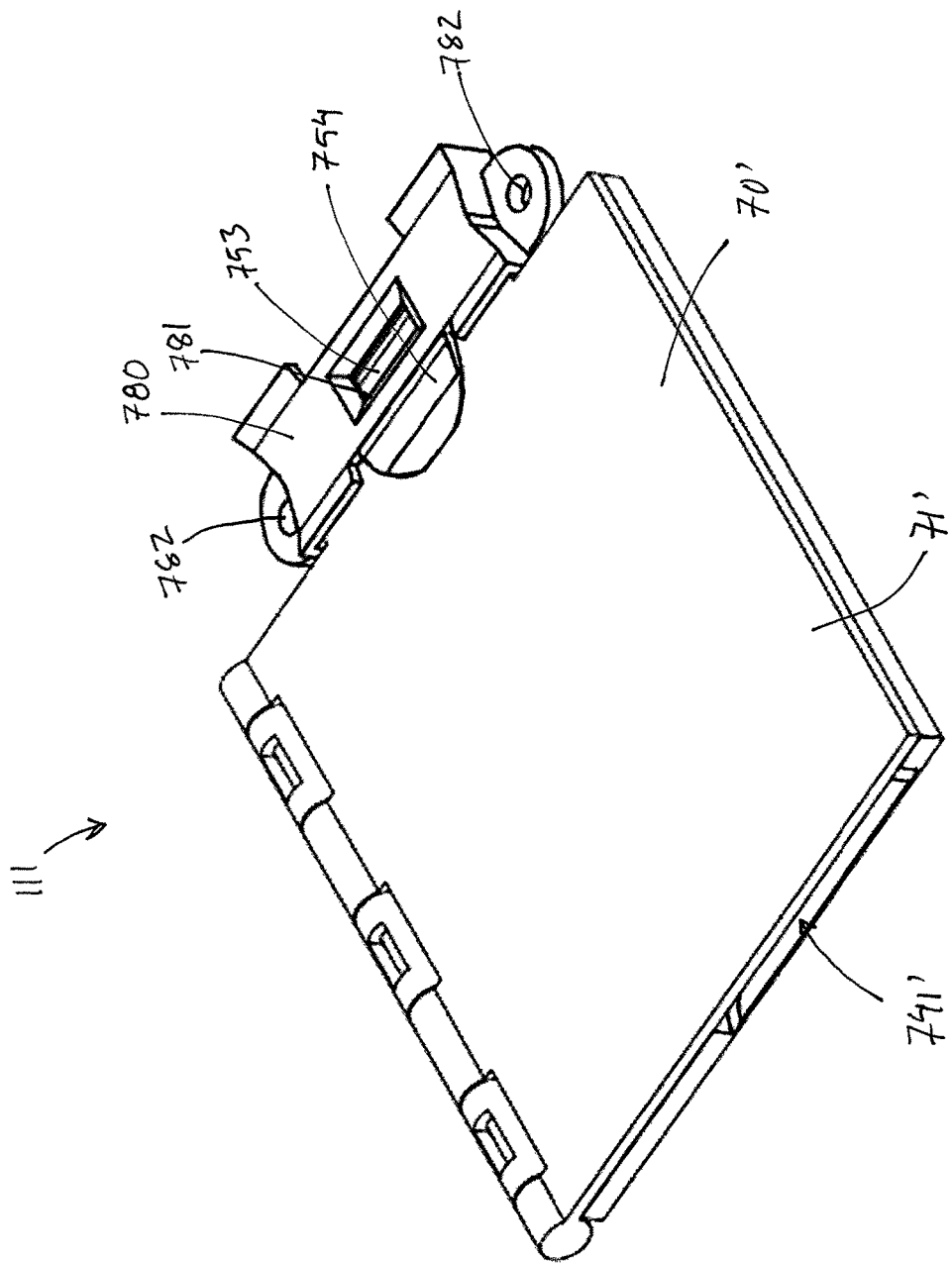
FIG. 28A-28C are various views of the trapping device of FIG. 27A attached to a mounting device.
Figure 28C:
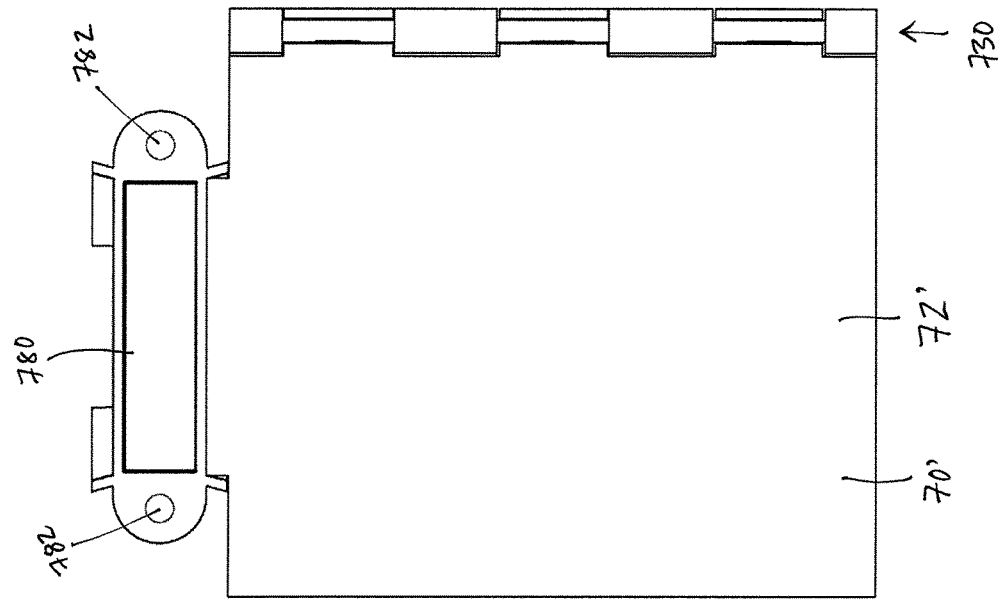
Figure 28B:
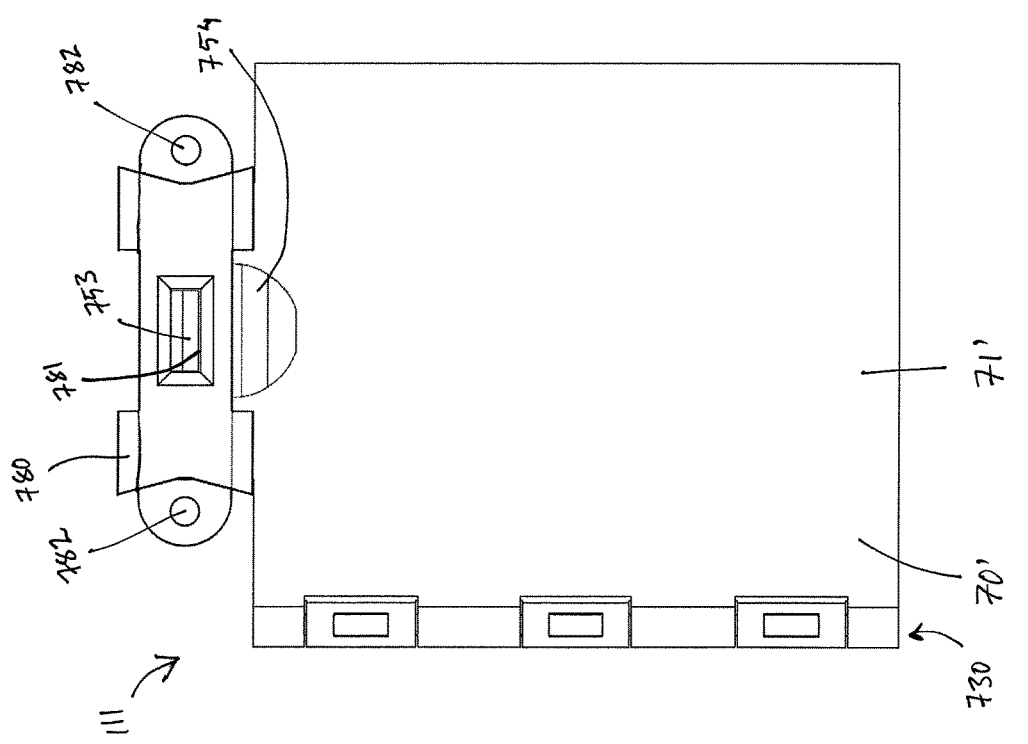
Figure 28D:
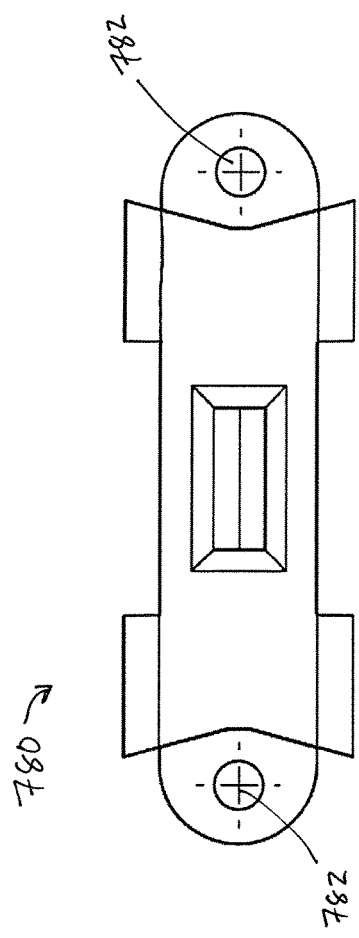
FIGS. 28D and 28E are views of the mounting device of FIGS. 28A-28C.
Figure 28E:
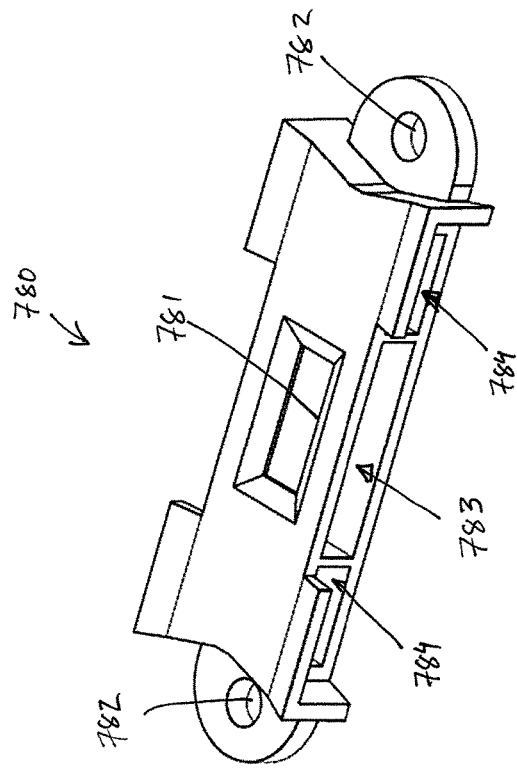

Additional prototypes of traps with multiple wing sections, two entrance areas, and a collecting area were constructed from various materials. Trap A was constructed of white paper; trap B of white paper, cut with rounded corners; trap C of grey paper; trap D of brown construction paper; and trap E of brown construction paper encased in a transparent plastic case. A picture of trap A is shown in FIG. 26A, trap B in FIG. 26B, trap C in FIG. 26C, trap D in FIG. 26D, and trap E in FIG. 26E.

While certain embodiments have been described, other embodiments may exist. While the specification includes a detailed description, the invention's scope is indicated by the following claims. Furthermore, while the specification has been described in language specific to structural features and/or methodological acts, the claims are not limited to the features or acts described above. Rather, the specific features and acts described above are disclosed as illustrative aspects and embodiments. Various other aspects, embodiments, modifications, and equivalents thereof which, after reading the description herein, may suggest themselves to one of ordinary skill in the art without departing from the spirit of the present disclosure or the scope of the claimed subject matter.

What is claimed is:

1. A trapping device for capturing crawling insects, the trapping device comprising:
    support structure having at least a first edge, the support structure comprising a trap surface portion and a second surface portion;
    the trap surface portion having a texture that is suitable for insects to crawl on when the trap surface is in a substantially vertical position, the trap surface portion including a base funnel, a wing area, and a collecting area,
        the base funnel having a first greatest width in a direction parallel to the first edge of the support structure, the base funnel including:
            an entrance edge adjacent the first edge of the support structure; and
            a first neck having a first neck width narrower than the first greatest width of the base funnel, the first neck being located in use at an opposite end of the base funnel from the entrance edge and extending away from the entrance edge;
        the wing area having a second greatest width that is greater than the first neck width, the wing area engaging the first neck, the wing area comprising:
            one or more wing sections having angled edges
        the collecting area having a third greatest width, the collecting area engaging a bridge having a bridge width narrower than the third greatest width of the collecting area, and a bridge length extending from the collecting area to the wing area; and
    the second surface portion having a texture that is not suitable for insects to crawl on when the support structure is in a substantially vertical position, the second surface portion engaging and surrounding the trap surface portion at one or more edges excluding at least the entrance edge of the base funnel so that the insects remain on the trap surface.

2. The trap of claim 1, wherein the support structure further comprises a support foot that holds the trap surface in a substantially vertical position.

3. The trap of claim 1, wherein the trap surface comprises material selected from the group consisting of paper, fabric, paper board, cardboard, loop material, felt, wood, fiberboard, fiber-glass and combinations thereof.

4. The trap of claim 1, wherein the wing area of the trap surface comprises at least two wing sections spaced apart by narrow necks extending vertically from the entrance edge when the trapping device is in use.

5. The trap of claim 1, wherein the angled edges of the wing sections comprise one or more angled bottom and top edges, wherein the bottom and top edges of the wings are parallel to each other and angle to guide bugs away from the base funnel.

6. The trap of claim 1, wherein the bridge extends horizontally from the wing area to the collecting area when the trap is in a vertical position and the trap further comprises a catching area disposed below the collecting area for catching insects that fall off of the trap surface, the catching area including an agent capable of immobilizing insects.

7. The trap of claim 6, wherein the agent comprises adhesive.

8. The trap of claim 6, wherein the agent comprises insecticide.

9. The trap of claim 1, wherein the trap comprises a case that encloses the support structure on at least four sides, wherein the support structure defines a wall of the case, the case comprising one or more entrance openings.

10. The trap of claim 9, wherein the case comprises a catching area with an adhesive agent capable of immobilizing insects.

11. The trap of claim 9, wherein the case is constructed of a material with a surface having less texture than the trap surface.

12. The trap of claim 1, wherein at least some of the angled edges of the wing sections include repellent.

13. The trap of claim 1, further comprising at least one wing support plate disposed away from the first edge of the support structure, extending away from the support structure at a diagonal angle, the wing support plate having a trap surface having a texture suitable for insects to crawl on, the trap surface of the wing support plate facing the support structure so that any insects that fall off of the trap surface portion of the support structure will fall onto the wing support plate.

14. The trap of claim 1, wherein the second greatest width of the wing area is in a direction parallel to the first edge of the support structure; the third greatest width of the collecting area is in a direction perpendicular to the first edge of the support structure; and the bridge length extends in a horizontal direction when the trapping device is in use.

15. A trapping device for capturing crawling insects, the trapping device comprising:
  a support structure having at least a first edge, the support structure comprising a trap surface portion and a second surface portion;
    the trap surface portion having a texture suitable for insects to crawl on when the trap surface portion is substantially vertical, the trap surface portion having a perimeter edge defining a first entrance area, a first neck, a trap area, a first bridge, and a first collecting area,
    the first entrance area having a first greatest width in a direction parallel to the first edge and being positioned adjacent the first edge of the support structure;
    the first neck extending away from the first entrance area at a location opposite the first edge of the support structure, the first neck having a first neck width narrower than the first greatest width of the first entrance area that is suitable to guide the crawling insects away from the first edge and into the trap area while discouraging the insects from returning to the first entrance area;
    the trap area having a second greatest width in a direction parallel to the first edge that is wider than the first neck width and a having a first greatest height in a direction perpendicular to the first edge;
    the first bridge extending laterally from the trap area and engaging the first collecting area, the bridge having a bridge height narrower than the first greatest height of the trap area that is suitable to guide the crawling insects away from the trap area and into the first collecting area while discouraging the insects from returning to the trap area;
    the first collecting area extending laterally from the first bridge having a second greatest height in a direction perpendicular to the first edge that is greater than the first bridge height;
  the second surface portion having a texture that is not suitable for insects to crawl on when the trap surface portion is substantially vertical, the second surface portion engaging the perimeter edge of the trap surface portion.

16. The trapping device of claim 15, wherein the entrance area comprises an entrance edge that intersects with the first edge of the support structure.

17. The trapping device of claim 16, wherein the first greatest width of the entrance area is proximate the entrance edge.

18. The trapping device of claim 15, wherein the trap surface portion further comprises a second bridge engaging the trap area and extending horizontally into a second collecting area having a third greatest height, the second bridge having a second bridge height that is less than the first greatest height of the trap area and the third greatest height of the second collecting area.

19. The trapping device of claim 15, wherein the trap area comprises two or more wing sections spaced apart by narrow neck sections extending vertically when the trap surface is in a vertical position, where the first bridge engages one of the two or more wing sections.

20. The trapping device of claim 15, wherein the trap surface portion further comprises a second entrance area having a third greatest width in a direction parallel to a second edge of the support structure and being positioned adjacent the second edge of the support structure, and a second neck extending away from the second entrance area at a location opposite the second edge of the support structure, the second neck having a second neck width narrower than the second greatest width of the second entrance area that is suitable to guide the crawling insects away from the second edge and into the trap area while discouraging the insects from returning to the second entrance area.

* * * * *

UNITED STATES PATENT AND TRADEMARK OFFICE
CERTIFICATE OF CORRECTION

PATENT NO. : 10,136,631 B2
APPLICATION NO. : 14/628433
DATED : November 27, 2018
INVENTOR(S) : Thuis et al.

Page 1 of 1

It is certified that error appears in the above-identified patent and that said Letters Patent is hereby corrected as shown below:

On the Title Page

(57) Abstract, Line 6: "to either one the" should read --to either one of the--

In the Claims

Column 16, Line 15, Claim 15: "width and a having a first" should read --width and having a first--

Signed and Sealed this
Second Day of July, 2019

Andrei Iancu
*Director of the United States Patent and Trademark Office*